United States Patent
Awane

(10) Patent No.: US 9,515,546 B2
(45) Date of Patent: Dec. 6, 2016

(54) POWER CONVERSION DEVICE HAVING INITIAL CHARGING CIRCUIT

(75) Inventor: Kazutoshi Awane, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 11 days.

(21) Appl. No.: 14/372,373

(22) PCT Filed: Jul. 4, 2012

(86) PCT No.: PCT/JP2012/067043
§ 371 (c)(1),
(2), (4) Date: Jul. 15, 2014

(87) PCT Pub. No.: WO2013/175644
PCT Pub. Date: Nov. 28, 2013

(65) Prior Publication Data
US 2015/0043253 A1    Feb. 12, 2015

(30) Foreign Application Priority Data

May 24, 2012   (JP) ................................ 2012-118201

(51) Int. Cl.
*H02J 3/12*     (2006.01)
*G05F 1/00*    (2006.01)
(Continued)

(52) U.S. Cl.
CPC ................. *H02M 1/32* (2013.01); *H02M 1/36* (2013.01); *H02M 1/4208* (2013.01);
(Continued)

(58) Field of Classification Search
CPC ............. H02M 2001/0045; H02M 2001/0067; H02M 2001/008; H02M 1/4258; H02M 7/1555; H02M 7/1557; H02M 7/2176
(Continued)

(56) References Cited

U.S. PATENT DOCUMENTS

2005/0259370 A1* 11/2005 Kubo ...................... H02P 27/06
                                                                361/42
2008/0198632 A1*  8/2008 Takayanagi ........... H02M 7/797
                                                                363/17
(Continued)

FOREIGN PATENT DOCUMENTS

EP     2 357 720 A1    8/2011
JP     2004-015901 A   1/2004
(Continued)

OTHER PUBLICATIONS

International Search Report for PCT/JP2012/067043 dated Oct. 2, 2012 [PCT/ISA/210].

*Primary Examiner* — Adolf Berhane
*Assistant Examiner* — Gary Nash
(74) *Attorney, Agent, or Firm* — Sughrue Mion, PLLC; Richard C. Turner

(57) ABSTRACT

A power conversion device 300 includes: an AC/DC converter section 10 which has an initial charging circuit 36 that initially charges a smoothing capacitor 22 provided at an output portion, and converts alternating current power into direct current power; a DC/DC converter section 11 which performs voltage conversion of direct current power supplied from the smoothing capacitor 22; and a control unit 5 which controls output of the AC/DC converter section 10 and output supplied from the DC/DC converter section 11. The control unit 5 performs a predetermined charging from the initial charging circuit 36 to the smoothing capacitor 22 at start-up of the AC/DC converter section 10, and starts the operation of the DC/DC converter section 11 after completion of charging, whereby the circuit can be protected from an inrush current at start-up.

4 Claims, 19 Drawing Sheets

(51) Int. Cl.

| | | |
|---|---|---|
| *H02M 1/00* | (2006.01) | |
| *H02J 1/10* | (2006.01) | |
| *H02M 1/32* | (2007.01) | |
| *H02M 1/36* | (2007.01) | |
| *H02M 7/217* | (2006.01) | |
| *H02M 1/42* | (2007.01) | |
| *H02M 5/458* | (2006.01) | |
| *H02M 7/06* | (2006.01) | |
| *H02M 7/537* | (2006.01) | |
| *H02M 3/335* | (2006.01) | |
| *H02M 7/12* | (2006.01) | |

(52) U.S. Cl.
CPC ....... *H02M 1/4258* (2013.01); *H02M 5/4585* (2013.01); *H02M 7/06* (2013.01); *H02M 7/217* (2013.01); *H02M 7/537* (2013.01); *H02M 3/335* (2013.01); *H02M 7/125* (2013.01); *H02M 2001/007* (2013.01); *Y02B 70/126* (2013.01)

(58) Field of Classification Search
USPC .. 323/242, 266, 268, 352–354, 901; 363/49, 65, 67, 68, 71, 76, 78, 124
See application file for complete search history.

(56) References Cited

U.S. PATENT DOCUMENTS

| | | | |
|---|---|---|---|
| 2010/0080022 A1* | 4/2010 | Schmidt | H02M 7/062 363/53 |
| 2011/0084674 A1* | 4/2011 | Cadoux | H02M 1/36 323/282 |
| 2011/0215651 A1* | 9/2011 | Yamada | H02M 1/12 307/75 |
| 2012/0106218 A1* | 5/2012 | Awane | H02M 1/4258 363/127 |
| 2013/0058134 A1 | 3/2013 | Yamada et al. | |

FOREIGN PATENT DOCUMENTS

| | | |
|---|---|---|
| JP | 2011-193633 A | 9/2011 |
| JP | 2012-100399 A | 5/2012 |
| WO | 2007/129469 A1 | 11/2007 |
| WO | 2010/067467 A1 | 6/2010 |
| WO | 2011/151940 A1 | 12/2011 |

\* cited by examiner

POWER CONVERSION DEVICE HAVING INITIAL CHARGING CIRCUIT

CROSS REFERENCE TO RELATED APPLICATIONS

This application is a National Stage of International Application No. PCT/JP2012/067043 filed Jul. 4, 2012, claiming priority based on Japanese Patent Application No. 2012-118201 filed May 24, 2012, the contents of all of which are incorporated herein by reference in their entirety.

TECHNICAL FIELD

The present invention relates to a power conversion device which converts alternating current power into direct current power or converts direct current power into alternating current power.

BACKGROUND ART

A power conversion device which converts alternating current power of a commercial alternating current power supply into direct current power with high efficiency is needed in order to charge a power accumulator. Generally, a conventional power conversion device includes: an AC/DC converter section by which a commercial alternating current power supply is controlled with high power factor to perform alternating current/direct current conversion; and a DC/DC converter section which is placed at a subsequent stage thereof and is insulated between the primary side and the secondary side by a transformer, to supply to a load or to charge a battery.

As an example of such a power conversion device, a power conversion device disclosed in Patent Document 1 includes: a smoothing capacitor which smoothes direct current output of an AC/DC converter section that controls the power factor of an input alternating current with high efficiency to convert alternating current voltage into direct current voltage; and a DC/DC converter section that converts voltage of the smoothing capacitor into a secondary side direct current voltage insulated by a transformer, to supply to a load such as a battery. A control device of the power conversion device adjusts an output voltage target value of the AC/DC converter section in response to direct current output from the DC/DC converter section to the load; and thus, the variation width of a duty ratio of a semiconductor switching element in the DC/DC converter section can be suppressed and reduction in power loss at the DC/DC converter section is achieved to improve power conversion efficiency.

Furthermore, a power conversion device disclosed in Patent Document 2 includes a power converter which is composed of a main converter and a sub converter to convert alternating current power into direct current power; a charging resistor is further connected between the sub converter and an alternating current power supply; and a power accumulator of the sub converter is charged via this charging resistor during initial charging. A phase voltage of an input alternating current voltage can be shared by the main converter and the sub converter, which are connected in series; and thus, a pulse with high voltage does not need to perform switching by a high frequency and suppression of harmonics and reduction in power loss and electromagnetic noise can be achieved. The power accumulator of the sub converter is initially charged via the charging resistor; and thus, an inrush current to be flown into the power accumulator is prevented and the power accumulator can be charged.

Besides, a power conversion device disclosed in Patent Document 3 includes a switching circuit which performs direct current-alternating current conversion or alternating current-direct current conversion mutually between a direct current power supply and a power system. Then, the power conversion device further includes: a connection switch that connects the direct current power supply to the switching circuit; an interconnection switch that connects the switching circuit to the power system; a direct current side capacitor that smoothes direct current power between the connection switch and the switching circuit; and a filter capacitor that makes alternating current power of a predetermined frequency band pass through between the switching circuit and the interconnection switch. Then, alternating current power supplied from the power system is rectified to generate direct current power at start-up; and charging is performed up to a predetermined voltage to the direct current side capacitor via a charging resistor and to the filter capacitor via the switching circuit. Subsequently, the switching circuit is made to stop to charge the direct current side capacitor up to a rectified voltage of the power system; and then, connection of the interconnection switch and the connection switch and the operation of the switching circuit are restarted. This separates the load from the power conversion device during initial charging, and the power conversion device is connected to the load after reaching a state where initial charging has been completed and the influence of a subsequent stage load can be eliminated; and thus, suppression of an inrush current generated during the process of start-up is suppressed.

PRIOR ART DOCUMENT

Patent Document

[Patent Document 1] WO 2011/151940 A1
[Patent Document 2] WO 2007-129469 A1
[Patent Document 3] JP 2011-193633 A

SUMMARY OF THE INVENTION

Problems to be Solved by the Invention

However, Patent Document 1 mentions the normal operation of the power conversion device equipped with the AC/DC converter section and the DC/DC converter section provided at a subsequent stage; however, a problem exists in that prevention of the inrush current generated at start-up is not considered.

Moreover, Patent Document 2 discloses a method of performing initial charging of an internal capacitor; however, relationship with the operation state of the connected load is not mentioned. For example, in a configuration in which a DC/DC converter section is connected at a subsequent stage, a problem exists in that when the DC/DC converter section operates during initial charging, an initial charging time is prolonged and start-up is delayed. In addition to that, power loss of the resistor is large and accordingly power rating of the resistor and a heat dissipation mechanism increase; and besides, the operation of the AC/DC converter section and the DC/DC converter section becomes unstable and the inrush current flows through the alternating current power supply and thus there is a possibility to damage the circuit.

Furthermore, in Patent Document 3, a design is made such that the load is separated from the power conversion device during initial charging; and thus, a countermeasure against the inrush current is provided. However, when a DC/DC converter section is provided at a subsequent stage, a problem exists in that a different switch needs to be provided between the smoothing capacitor and the DC/DC converter section; and accordingly, it is necessary to change a control system due to the addition of the new switch and to take a dissipation measure due to the use of a semiconductor switch.

The present invention has been made to solve the above described problem, and an object of the present invention is to provide a power conversion device which does not need to add a new component and has the function of protecting a circuit from an inrush current at start-up by only adding a control method at start-up in a power conversion device having an AC/DC converter section and a DC/DC converter section.

Means for Solving the Problems

In order to solve the above described problem, according to claim 1 of the present invention, there is provided a power conversion device including: an alternating current/direct current conversion circuit section which has a smoothing capacitor provided at an output portion and an initial charging circuit that initially charges the smoothing capacitor, and converts alternating current power into direct current power; a direct current/direct current conversion circuit section which has a switching element, and performs voltage conversion of direct current power supplied from the smoothing capacitor by controlling the switching element; and a control unit which controls input and output of the alternating current/direct current conversion circuit section and the direct current/direct current conversion circuit section. In the power conversion device, the control unit performs a predetermined charging from the initial charging circuit and the alternating current/direct current conversion circuit section at start-up of the alternating current/direct current conversion circuit section, and starts operation of the direct current/direct current conversion circuit section after completion of charging of the smoothing capacitor.

Furthermore, according to an aspect of the present invention, there is provided a power conversion device including: a direct current/direct current conversion circuit section which has a capacitor provided at an input portion, an initial charging circuit that initially charges the capacitor, and switching elements, and performs voltage conversion of direct current power by controlling the switching elements; a direct current/alternating current conversion circuit section which converts direct current power supplied from the direct current/direct current conversion circuit section into alternating current; and a control unit which controls input and output of the direct current/alternating current conversion circuit section and the direct current/direct current conversion circuit section. In the power conversion device, the control unit performs a predetermined charging from the initial charging circuit to the capacitor at start-up of the direct current/direct current conversion circuit section, and starts operation of the direct current/alternating current conversion circuit section after completion of charging of the capacitor.

Advantageous Effect of the Invention

According to the present invention, a control method of performing initial charging of a capacitor at start-up by an initial charging circuit is added in a power conversion device having an AC/DC converter section and a DC/DC converter section; whereby, an effect exists in that the flow-in of an inrush current at start-up can be avoided and direct current-alternating current conversion operation can be stably performed.

MODE FOR CARRYING OUT THE INVENTION

Hereinafter, power conversion devices according to embodiments of the present invention will be described with reference to FIG. 1 to FIG. 19.

Embodiment 1

Figure 1:
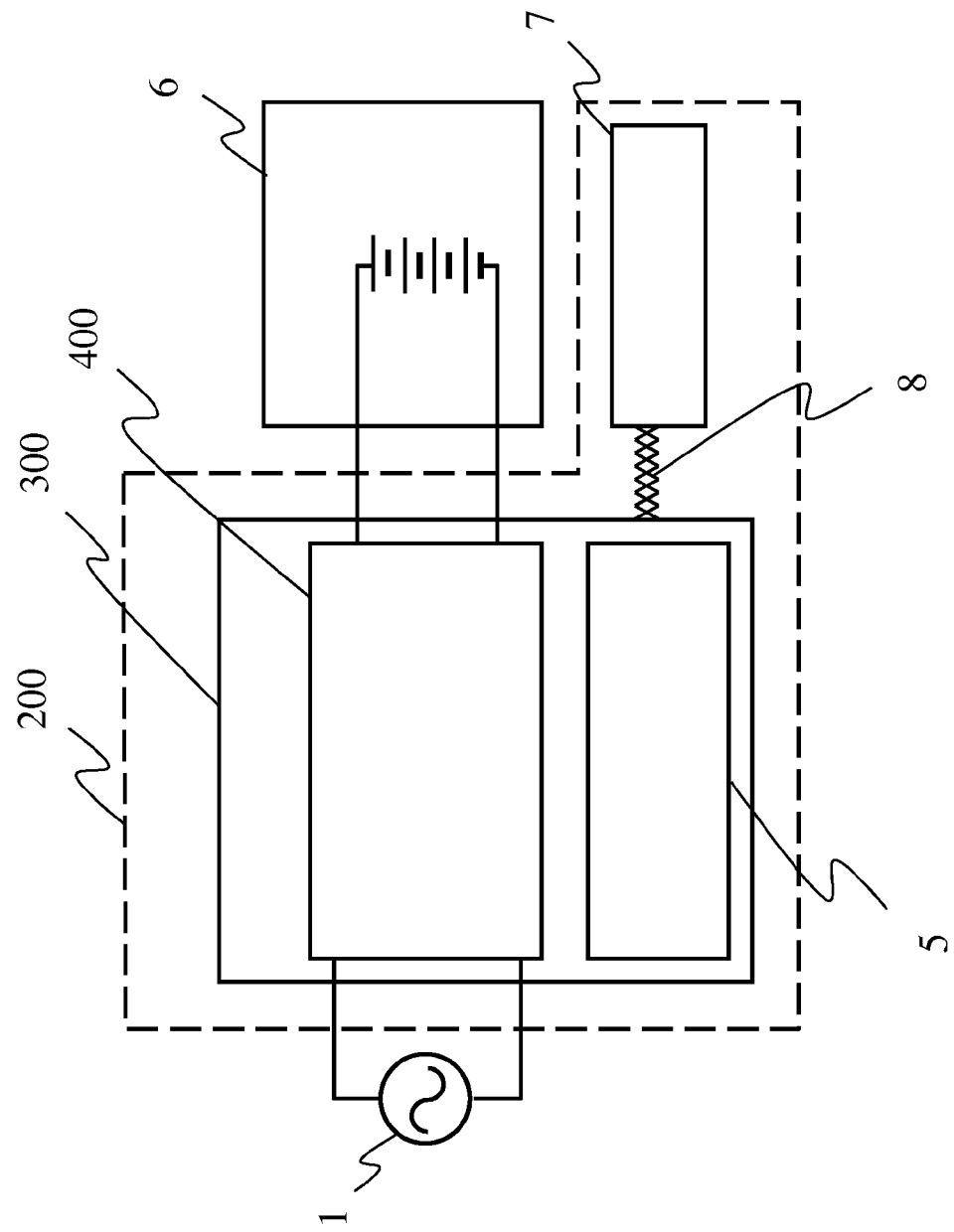
FIG. 1 is a block diagram showing the configuration of a power conversion system to which a power conversion device according to Embodiment 1 is applied.
Figure 2:
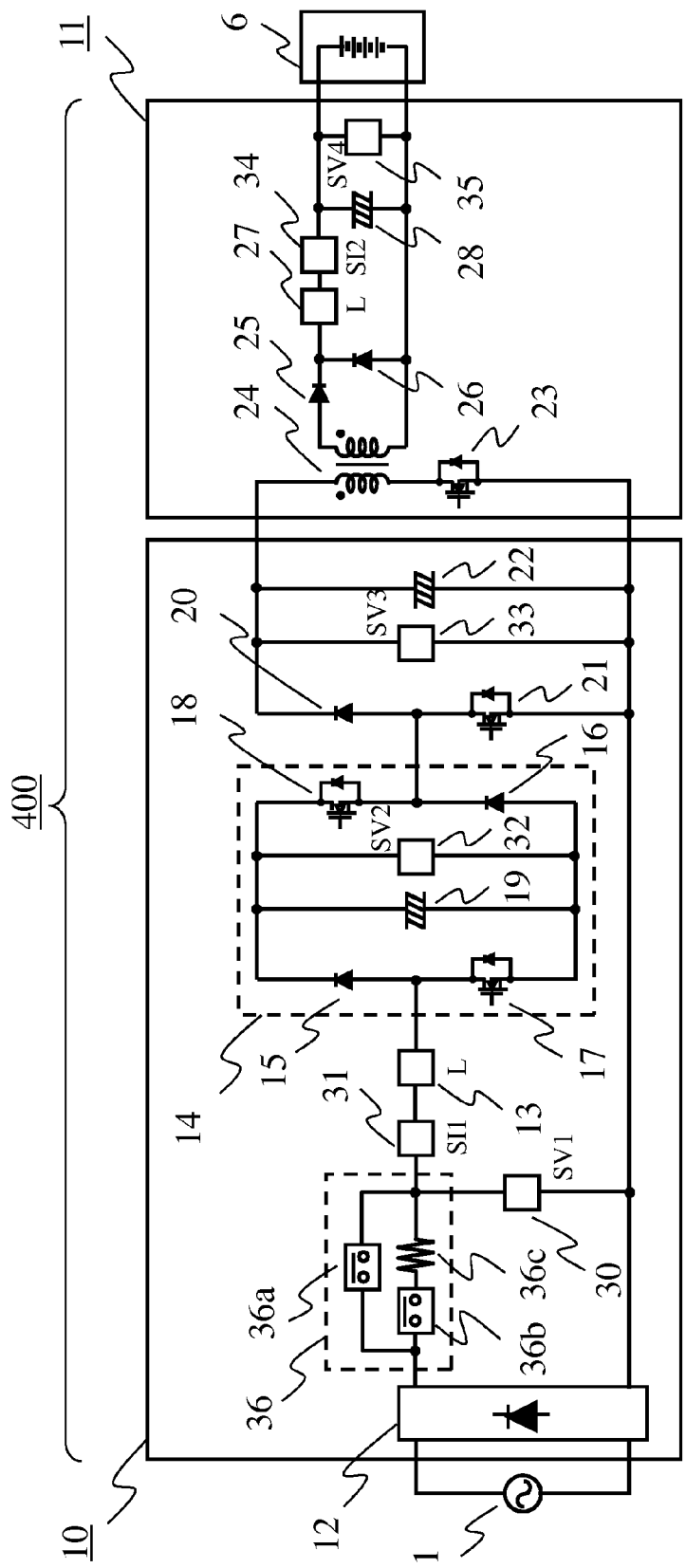
FIG. 2 is a diagram showing the circuit configuration of the power conversion device according to Embodiment 1.

FIG. 1 is a block diagram showing the configuration of a power conversion system to which a power conversion device according to Embodiment 1 is applied; and FIG. 2 is a diagram showing the circuit configuration of the power conversion device according to Embodiment 1.
[Configuration of Power Conversion System]

First, the entire configuration of the power conversion system to which the power conversion device according to Embodiment 1 is applied will be described by using FIG. 1. A power supply apparatus 200 includes: a power conversion device 300 having a power conversion circuit 400 that performs alternating current-direct current conversion and a control unit 5 that controls this circuit; and an electronic control device 7 that sends a command signal to the control unit 5 via a communication wire 8.

The power conversion circuit 400 is a circuit that performs power conversion by switching, receives input power supplied from an alternating current power supply 1, and charges a high voltage battery 6 serving as a load connected to an output stage. Furthermore, the power conversion circuit 400 is provided with a detection circuit at a predetermined position; and detected current and voltage are transmitted to the control unit 5. In addition, the control unit 5 receives an output power command from the electronic control device 7 via the communication wire 8, generates target power Pout* for use in switching control based on the output power command, and performs pulse width modulation (PWM) control of switching elements of the power conversion circuit 400 so as to follow the target power Pout*.

Besides, the high voltage battery 6 is a chargeable and dischargeable storage battery such as a lithium ion battery, and is charged by making a current to flow to the positive electrode side.

The electronic control device 7 is a higher rank control unit of the power supply apparatus 200, and transmits the output power command to the power conversion device 300 via the communication wire 8.

The communication wire 8 is a signal transmission line which is for communicating between the power conversion device 300 and the electronic control device 7 by a communication protocol such as CAN (see ISO11898 and ISO11519-2).
[Configuration of Power Conversion Device]

Subsequently, the circuit configuration of the power conversion circuit 400 will be described with reference to a circuit configuration diagram of the power conversion device shown in FIG. 2. The power conversion circuit 400 is configured by connecting two power conversion circuits of an AC/DC converter section (direct current/alternating current conversion circuit section) 10 and a DC/DC converter section (direct current/direct current conversion circuit section) 11 at a subsequent stage.

The AC/DC converter section 10 is composed of elements from an alternating current input 1 to a smoothing capacitor 22 and an initial charging circuit 36. The alternating current power supply 1 is connected to a diode bridge 12 serving as a rectifier circuit. In this case, a rectified voltage detection circuit (SV1) 30 is connected in parallel with the diode bridge 12. The output of the diode bridge 12 is input to one end of the initial charging circuit 36. Another one end of the initial charging circuit 36 is connected to a rectified current detection circuit (SI1) 31 and a reactor (L) 13 serving as a current limiting circuit; and a subsequent stage thereof is connected in series with the alternating current side of an inverter circuit 14 configured by a single inverter. The inverter circuit 14 includes: inverter configuration switches 17 and 18 such as an insulated gate bipolar transistor (IGBT) in which diodes are connected in reverse parallel and a metal oxide semiconductor field effect transistor (MOSFET) in which a diode is incorporated between a source and a drain; diodes 15 and 16; and a direct current voltage supply (capacitor) 19. Furthermore, a voltage detection circuit (SV2) 32 of the direct current voltage supply 19 is connected in parallel with the direct current voltage supply 19.

Furthermore, a short-circuiting switch 21 and a rectifier diode 20 are connected at a subsequent stage of the inverter circuit 14; and the cathode side of the rectifier diode 20 is connected to a positive electrode of the smoothing capacitor 22 at an output stage. In this case, a connection node between the short-circuiting switch 21 and an anode of the rectifier diode 20 is connected to an alternating current output wire at the subsequent stage of the inverter circuit 14; and the other end of the short-circuiting switch 21 is connected to a negative electrode of the smoothing capacitor 22. In addition, a voltage detection circuit (SV3) 33 of the smoothing capacitor 22 is connected in parallel with the smoothing capacitor 22.

Furthermore, the DC/DC converter section 11 is configured by elements from a subsequent stage of the smoothing capacitor 22 to a previous stage of the high voltage battery 6. In this case, a general forward converter circuit is used. The primary side of a transformer 24 is connected in series with a forward converter switch 23 at the subsequent stage of the smoothing capacitor 22; and the secondary side of the transformer 24 is connected in series with the secondary side rectifier diode 25 and is connected in parallel with the secondary side rectifier diode 26. A subsequent stage of the secondary side rectifier diodes 25 and 26 is connected to a smoothing reactor (L) 27, an output current detection circuit (SI2) 34, and a capacitor 28; and subsequently connected to the high voltage battery 6 that is a load, as the output of the DC/DC converter section 11. In this case, an output voltage detection circuit (SV4) 35 is connected in parallel with the capacitor 28.

Next, the operation of a normal charging mode of the power conversion device 300 will be described. First, the normal operation of the DC/DC converter section 11 will be described with reference to FIG. 3 and FIG. 4. Incidentally, the DC/DC converter section 11 of the present embodiment is the case where a general insulated type forward converter is used.

In this case, symbols are defined as follows:
Pout*: Control target power value generated by the control unit 5,
Iout: Output current value of the DC/DC converter section 11 detected by the output current detection circuit (SI2) 34,
Iout*: Control target current value of the output current Iout,
Vout: Output voltage value of the DC/DC converter section 11,
Vout*: Target voltage value of the output voltage value of the DC/DC converter section 11,
Vload: Load voltage value detected by the output voltage detection circuit (SV4) 35,
Vdc: Direct current voltage of the smoothing capacitor 22, and Vdc*: Target voltage value of the direct current voltage of the smoothing capacitor 22.

[State of Switch and Current Path]

The relationship between the state of the forward converter switch and a current path will be described with reference to FIG. 3 and FIG. 4 separately divided into the case where the forward converter switch 23 is made conductive and the case where the forward converter switch 23 is made open.

Figure 3:
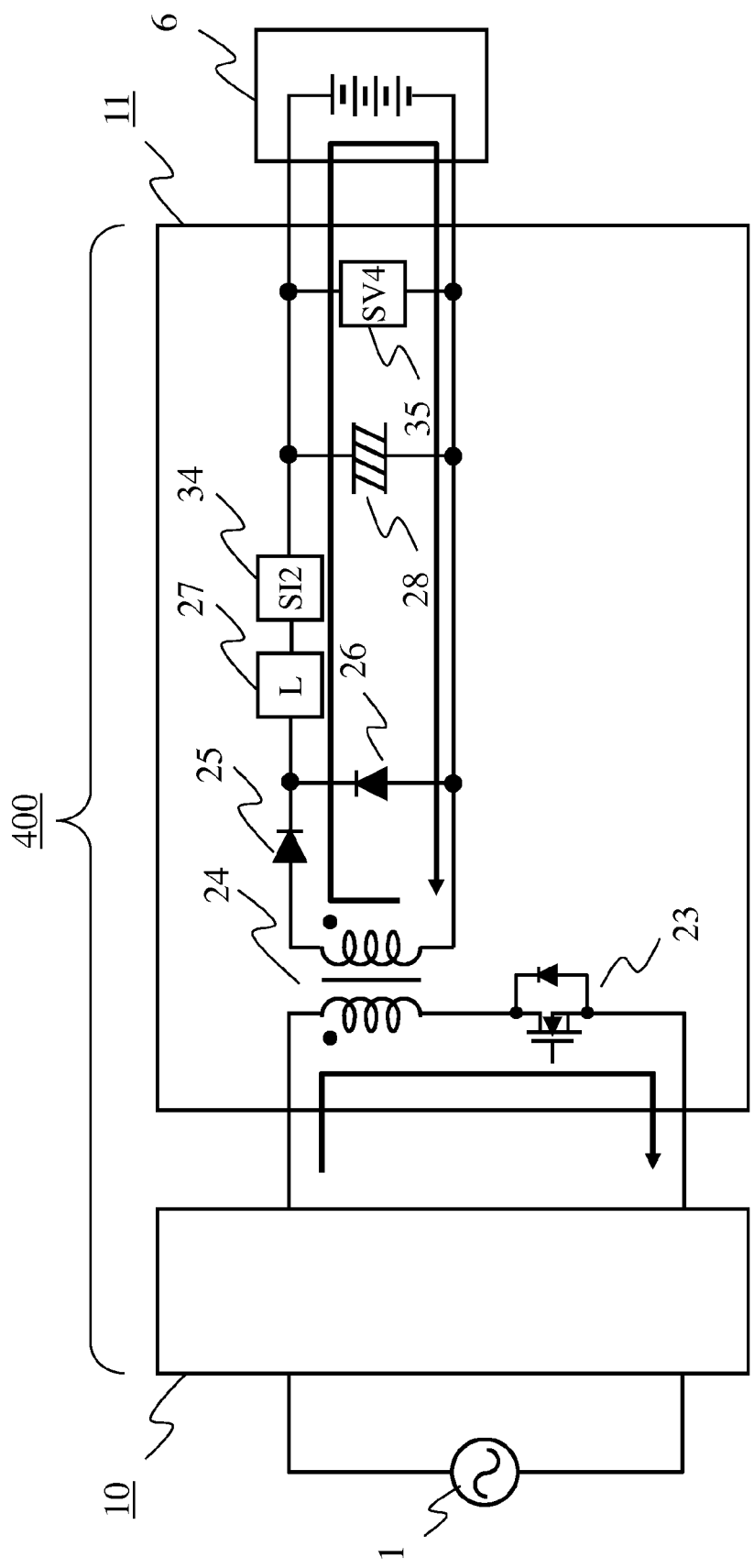
FIG. 3 is a diagram for explaining the operation of a DC/DC converter section in the power conversion device according to Embodiment 1 (Part 1)

As shown in FIG. 3, when the forward converter switch 23 is made conductive, current that flows through the primary winding side of the transformer 24 flows in a path of the AC/DC converter section 10→the transformer 24 (primary winding side)→the forward converter switch 23→the AC/DC converter section 10. In this case, the transformer 24 transmits power from the primary side to the secondary side; and current that flows through the secondary winding side of the transformer 24 flows in a path of the transformer 24 (secondary winding side)→the secondary side rectifier diode 25→the smoothing reactor (L) 27→the high voltage battery 6→the transformer 24 (secondary winding side).

Figure 4:
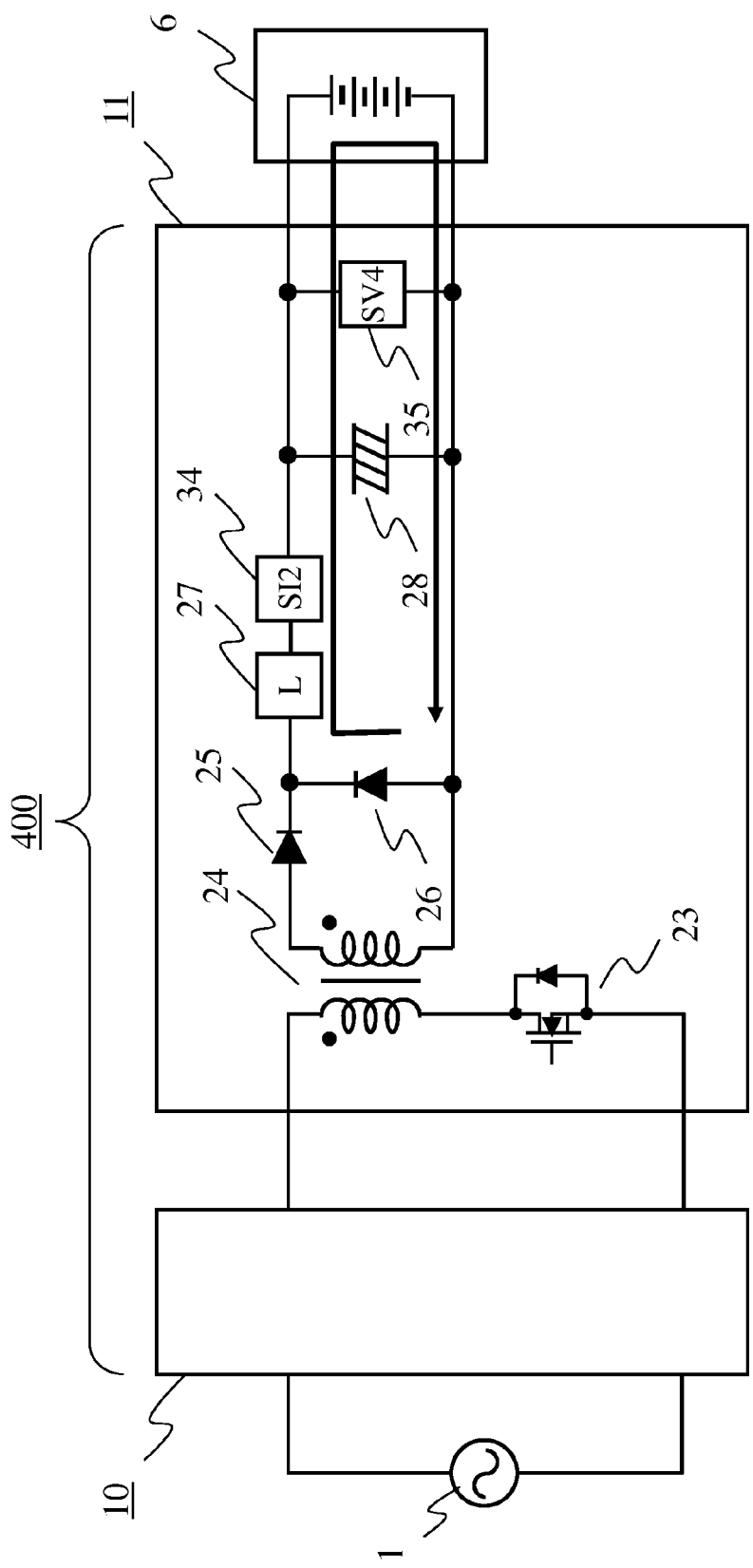
FIG. 4 is a diagram for explaining the operation of a DC/DC converter section in the power conversion device according to Embodiment 1 (Part 2)

Next, as shown in FIG. 4, when the forward converter switch 23 is opened, current does not flow through the primary side of the transformer 24 and the power is not transmitted to the secondary side. In this regard, however, in the secondary side, current flows in a path of the smoothing reactor (L) 27→the high voltage battery 6→the secondary side rectifier diode 26→the smoothing reactor (L) 27, by self-induction of the smoothing reactor (L) 27.

[Output Voltage Vout]

Output voltage Vout of the DC/DC converter section 11 will be described. In this case, when the number of turns of the primary side of the transformer 24 is N1, the number of turns of the secondary side is N2, a conduction time of the forward converter switch 23 is ton, and a period of switching conduction and opening of the forward converter switch 23 is T, the output voltage Vout of the DC/DC converter section 11 can be expressed by the following equation.

$$Vout = \frac{N2}{N1} \cdot Vdc \cdot \frac{ton}{T} \qquad \text{[Equation 1]}$$

As described above, it turns out that the output voltage Vout of the DC/DC converter section 11 can be controlled by the conduction time ton of the forward converter switch 23. More specifically, PWM control of the forward converter switch 23 is performed to control the output voltage Vout of the DC/DC converter section 11 and the output current Iout to be supplied to the high voltage battery 6 is adjusted; and thus, output that follows the target power Pout* can be obtained. Incidentally, the load voltage Vload detected by the output voltage detection circuit 35 is fixed to a voltage value of the high voltage battery 6; and therefore, the load voltage Vload is a different value from the output voltage Vout in the present embodiment.

[Control for Making Output Power Pout Follow Target Power Pout*]

Next, control by the control unit 5 for making the output power Pout follow the target power Pout* will be described.

Figure 5:
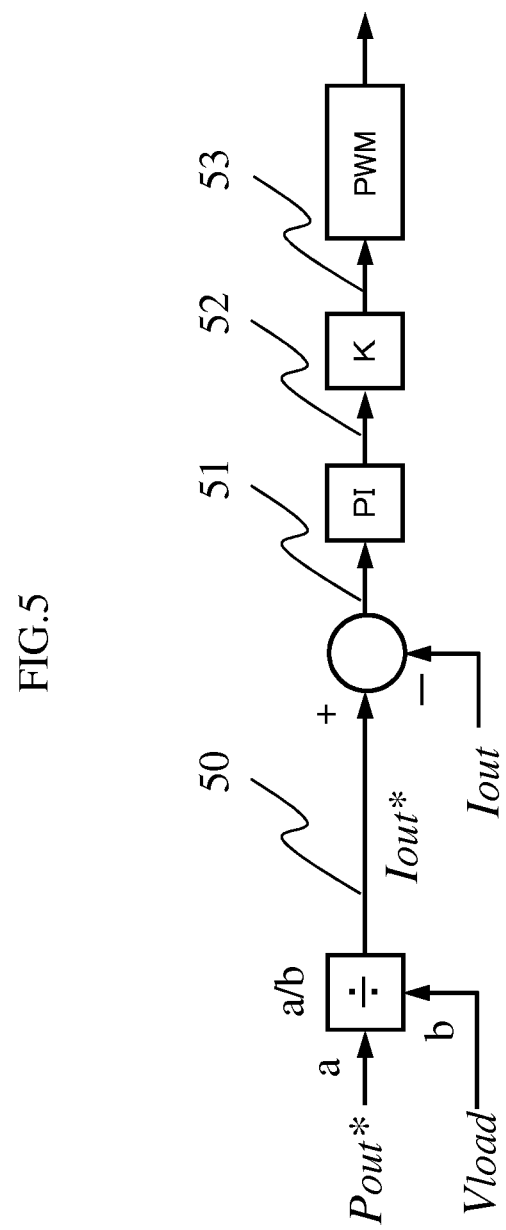
FIG. 5 is a control block diagram of the DC/DC converter section in the power conversion device according to Embodiment 1.

The forward converter switch 23 is controlled by a control block as shown in FIG. 5. In this case, first, the target power Pout* is divided by the load voltage Vload to calculate the target current Iout* 50. In the present embodiment, the high voltage battery 6 is connected as the load; and when it is assumed that a voltage rise caused by the charging of the high voltage battery 6 is sufficiently gradual and internal resistance is minute, the load voltage Vload can be assumed to be substantially constant and therefore the target current Iout* 50 can be calculated as described above.

Further, output performed by proportional-integral (PI) control by using the difference 51 between the output current Iout and the target current Iout* 50 as the amount of feedback is regarded as target voltage Vout* 52 of the output voltage Vout of the DC/DC converter section 11. Then, PWM duty 53 that outputs the target voltage Vout* 52 of the output voltage Vout is calculated by the turn ratio (N2/N1) of the transformer 24 and the target voltage Vdc* of the direct current voltage Vdc of the smoothing capacitor 22. Incidentally, a method of calculating the target voltage Vdc* will be described later. A driving signal to be supplied to the forward converter switch 23 is generated by the PWM control to operate the DC/DC converter section 11, by using the PWM duty 53.

[Normal Operation of AC/DC Converter Section]

Subsequently, normal operation of the AC/DC converter section 10 will be described based on waveforms of respective portions shown in FIG. 6. In this case, a method of performing normal charging will be described; however, the initial charging circuit 36 is short-circuited during normal charging in the present embodiment 1 (to be described later); and therefore, the initial charging circuit 36 is omitted in the drawings of FIG. 7 through FIG. 9 and description thereof.

In this case, symbols are defined as follows:

Vin: Voltage value after passing through the diode bridge 12, the voltage value being detected by the rectified voltage detection circuit (SV1) 30, Iin: Current value after passing through the diode bridge 12, the current value being detected by the rectified current detection circuit (SI1) 31, Vsub: Voltage value of the direct current voltage supply 19 in the inverter circuit 14, the voltage value being detected by the voltage detection circuit (SV2) 32 of the direct current voltage supply 19, Vsub*: Control target voltage value of the direct current voltage supply 19 in the inverter circuit 14, Vdc: Voltage value of the smoothing capacitor 22, the voltage value being detected by the smoothing capacitor voltage detection circuit (SV3) 33, Vdc*: Control target voltage value of the smoothing capacitor 22, and θ: Voltage phase of input supplied from the alternating current power supply 1.

Figure 6:
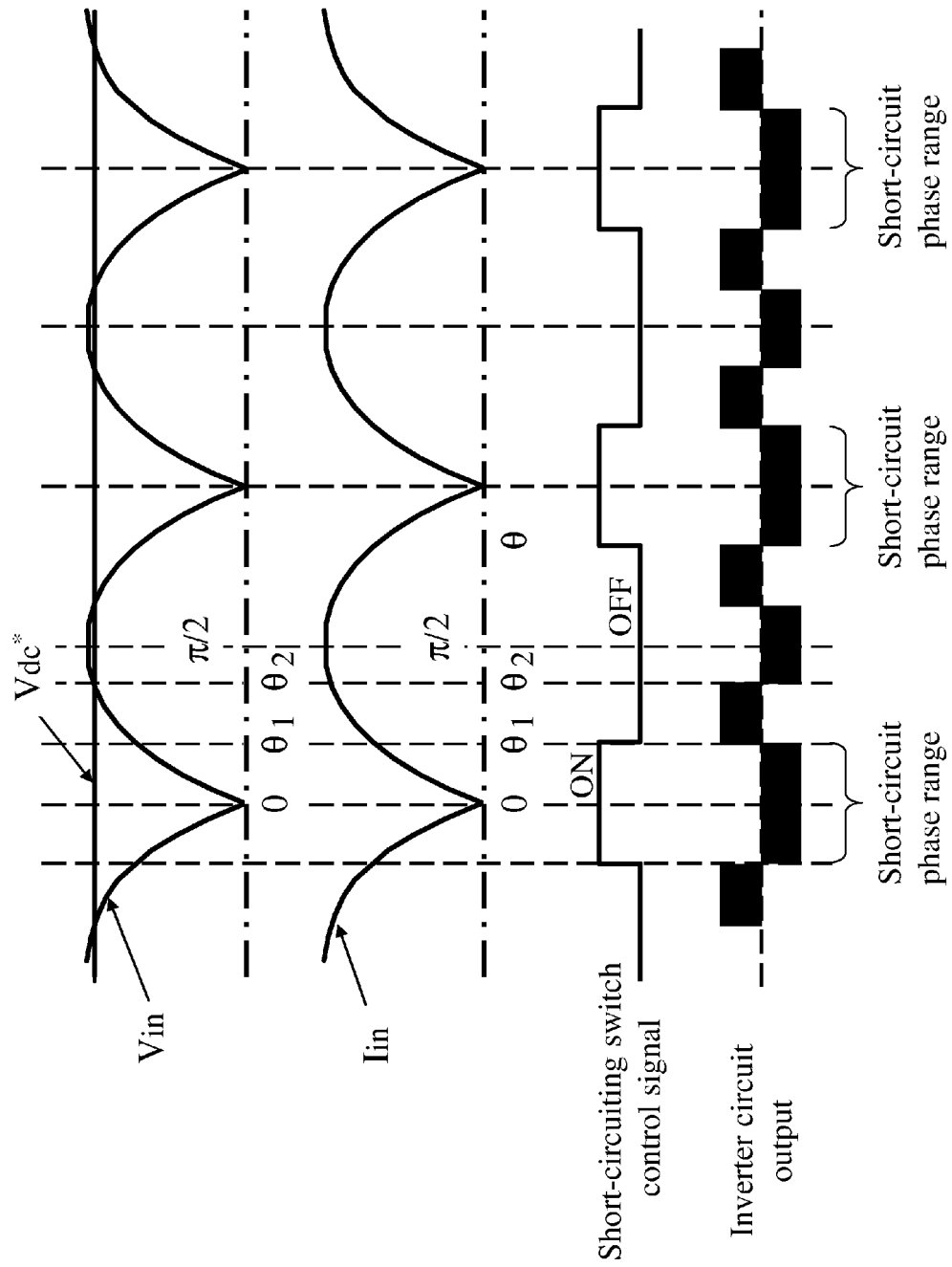
FIG. 6 is a diagram showing waveforms during the operation of the power conversion device according to Embodiment 1.

Input supplied from the alternating current power supply 1 is full-wave rectified by the diode bridge 12, and the voltage Vin and the current Iin at the subsequent stage of the diode bridge 12 become the waveforms as shown in FIG. 6. In this case, a peak voltage of the voltage Vin is higher than the direct current voltage Vdc of the smoothing capacitor 22 to be controlled to the constant target voltage Vdc*.

[PWM Control of Inverter Circuit]

Figure 7:
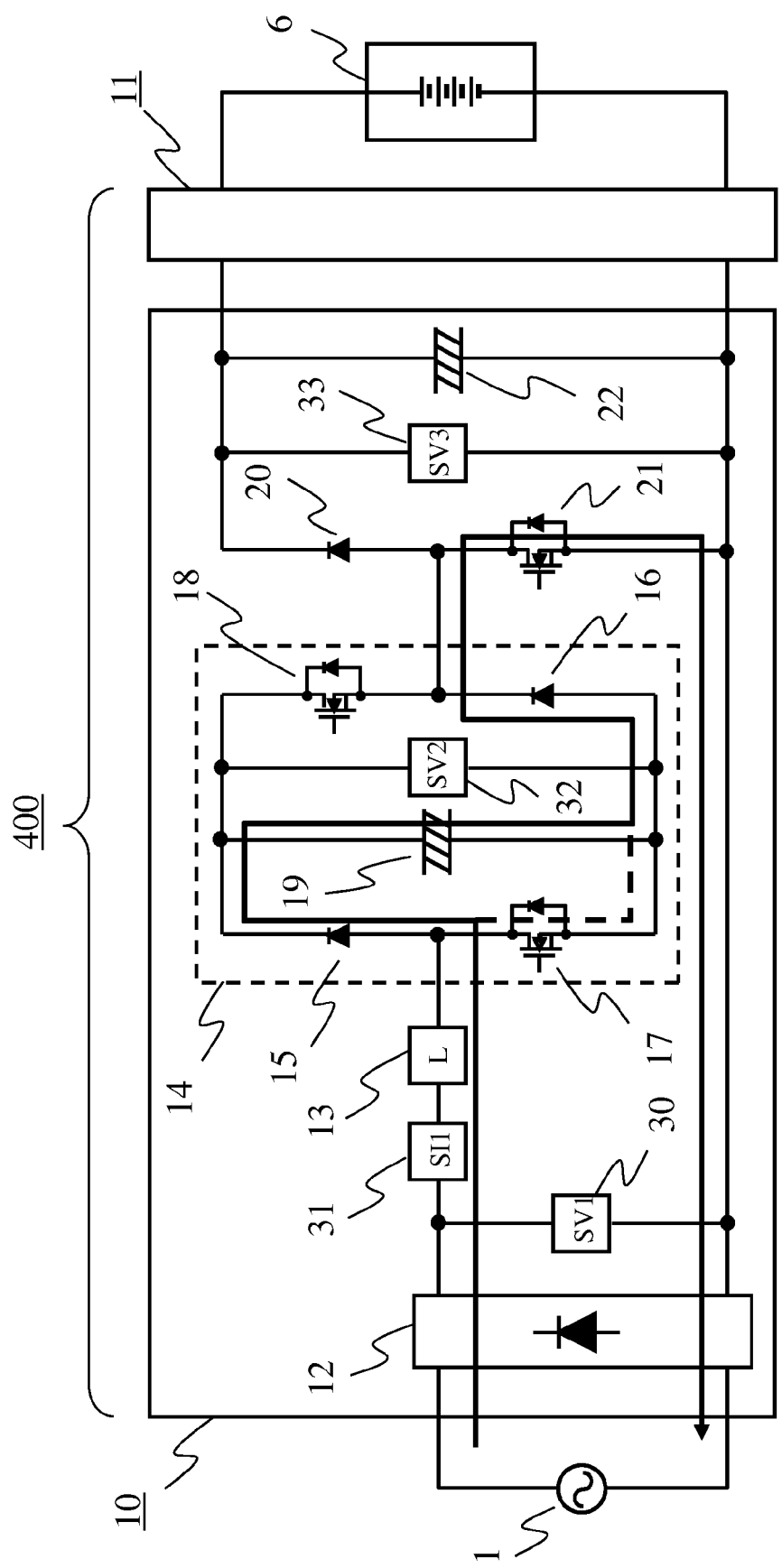
FIG. 7 is a diagram for explaining the operation of an AC/DC converter section in the power conversion device according to Embodiment 1 (Part 1)
Figure 8:
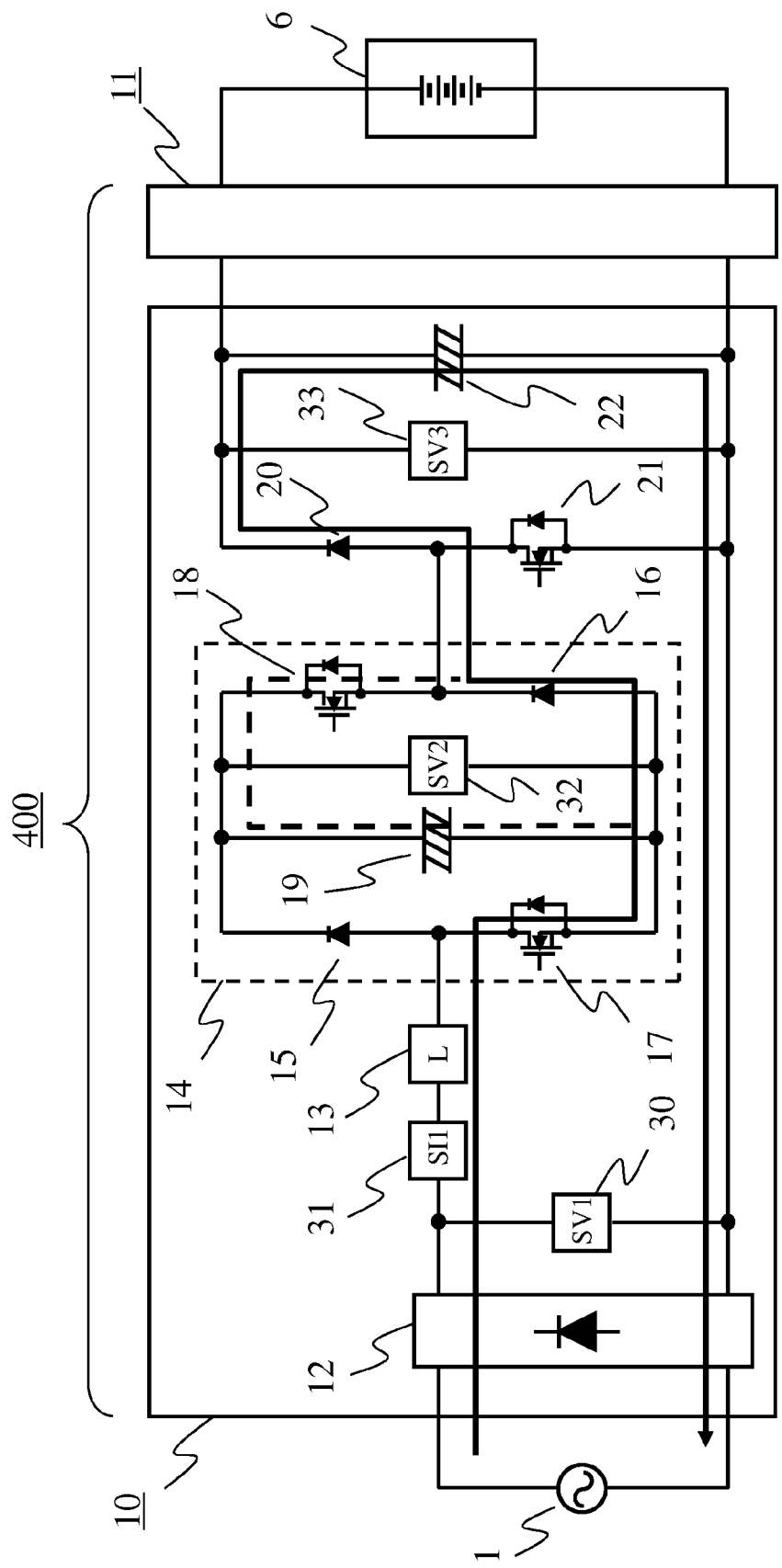
FIG. 8 is a diagram for explaining the operation of the AC/DC converter section in the power conversion device according to Embodiment 1 (Part 2)
Figure 9:
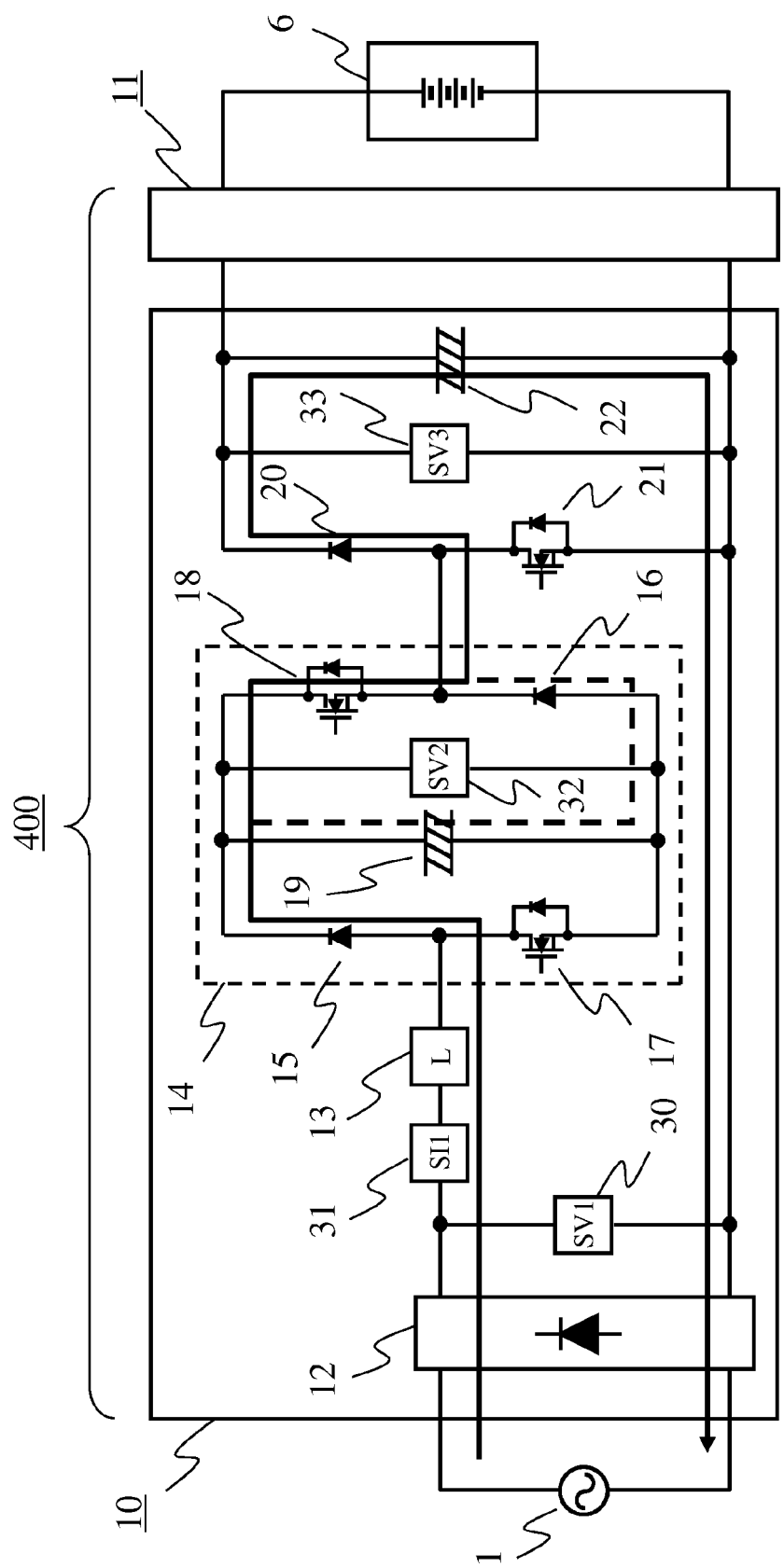
FIG. 9 is a diagram for explaining the operation of the AC/DC converter section in the power conversion device according to Embodiment 1 (Part 3).

PWM control of the inverter circuit 14 is performed by the control unit 5 to output the current Iin so that the power factor of input supplied from the alternating current power supply 1 becomes substantially 1 and superimposes a generated voltage of the alternating current side on the voltage Vin at the subsequent stage of the diode bridge 12. Current in the inverter circuit 14 passes through the diode 15 to charge the direct current voltage supply 19 and is output through the diode 16 when the inverter configuration switches 17 and 18 are made open as shown in FIG. 7 through FIG. 9. Furthermore, when only the inverter configuration switch 17 is made conductive, the current is output through the inverter configuration switch 17 and the diode 16. In addition, similarly, when only the inverter configuration switch 18 is made conductive, the current is output through the diode 15 and the inverter configuration switch 18. Moreover, when the inverter configuration switches 17 and 18 are simultaneously made conductive, the current passes through the inverter configuration switch 17 to make the direct current voltage supply 19 discharge and is output through the inverter configuration switch 18. The inverter configuration switches 17 and 18 are controlled by the control unit 5 by combining such four types of control to perform PWM control of the inverter circuit 14.

[Relationship Between Alternating Current Power Supply Voltage Phase and Short-Circuiting Switch (Current Path)]

[In the Case of 0<θ<θ1]

The voltage phase of input supplied from the alternating current power supply 1 is θ, the phase θ at the time when the voltage Vin is equal to the target voltage Vdc* of the smoothing capacitor 22 is θ2 (0<θ2<π/2), and the short-circuiting switch 21 is in a conductive state from a phase θ=0 to a predetermined phase θ1 of 0<θ1<θ2. In this case, as shown in FIG. 7, current supplied from the alternating current power supply 1 flows in a path of the alternating current power supply 1→the diode bridge 12→the reactor 13→the inverter circuit 14→the short-circuiting switch 21→the diode bridge 12→the alternating current power supply 1. The short-circuiting switch 21 is in a conductive state and thus the current does not flow through the rectifier diode 20 and the smoothing capacitor 22. The inverter circuit 14 controls and outputs the current Iin by PWM control so that the power factor of input is substantially 1 while generating a voltage substantially equal to the opposite polarity of the voltage Vin by combining, for example, the case where the inverter configuration switches 17 and 18 are made open and the case where only the inverter configuration switch 17 is made conductive; and in the case of 0<θ<θ1, the direct current voltage supply 19 of the inverter circuit 14 is charged.

[In the Case of θ=θ1]

Next, in the case where the phase θ is θ1, when the short-circuiting switch 21 is opened, as shown in FIG. 8, current supplied from the alternating current power supply 1 flows in a path of the alternating current power supply 1→the diode bridge 12→the reactor 13→the inverter circuit 14→the rectifier diode 20→the smoothing capacitor 22→the diode bridge 12→the alternating current power supply 1.

[In the Case of θ2≤θ≤π/2]

Next, in the phase θ=θ2, when the voltage Vin is equal to the direct current voltage Vdc* of the smoothing capacitor 22, the short-circuiting switch 21 continues an opened state; however, the operation of the inverter circuit 14 changes.

More specifically, in the case where the phase θ is θ2≤θ≤π/2, as shown in FIG. 9, the current supplied from the alternating current power supply 1 flows in a path of the alternating current power supply 1→the diode bridge 12→the reactor 13→the inverter circuit 14→the rectifier diode 20→the smoothing capacitor 22→the diode bridge 12→the alternating current power supply 1. Furthermore, the inverter circuit 14 outputs by PWM control by combining, for example, the case where inverter configuration switches 17 and 18 are made open and the case where only the inverter configuration switch 18 is made conductive. At this time, the target voltage Vdc* of the smoothing capacitor 22 is Vdc*≤Vin, and the inverter circuit 14 controls and outputs the current Iin so that the power factor of input is substantially 1 while generating a voltage substantially equal to Vdc−Vdc* in an opposite polarity with respect to the polarity of Vin so that the direct current voltage Vdc of the smoothing capacitor 22 can maintain the target voltage Vdc*. In the case of θ2≤θ≤π/2, the polarity of a voltage generated by the inverter circuit 14 is opposite to the polarity of the current Iin and thus the direct current voltage supply 19 of the inverter circuit 14 is charged.

[In the Case of π/2≤θ≤π]

As shown in FIG. 6, operation symmetrical to a phase period of the aforementioned 0≤θ≤π/2 is performed in a phase period of π/2≤θ≤π, and operation similar to a phase period of 0≤θ≤π is performed in a phase period of π≤θ≤2π.

More specifically, the short-circuiting switch 21 is switched by assuming that a zero cross phase (θ=0, π)±θ1 of the phase θ of the voltage Vin supplied from the alternating current power supply 1 serves as a specific phase; and the short-circuiting switch 21 is made to be in a conductive state to bypass the smoothing capacitor 22 only in a phase range (hereinafter, referred to as a short-circuit phase range) of ±θ1 by regarding the above zero cross phase as the center. At this time, the inverter circuit 14 controls and outputs the current Iin so that the power factor of input is substantially 1 while generating a voltage substantially equal to the opposite polarity of the voltage Vin, and the direct current voltage supply 19 is charged. Then, at the phase other than the above short-circuit phase range, the inverter circuit 14 maintains the direct current voltage Vdc of the smoothing capacitor 22 at the target voltage Vdc* and controls and outputs the current Iin so that the power factor of input is substantially 1. At this time, when the voltage Vin is less than or equal to the target voltage Vdc* of the smoothing capacitor 22, the direct current voltage supply 19 is discharged; and when the voltage Vin is equal to or more than the target voltage Vdc*, the direct current voltage supply 19 is charged.

[Relationship Between Voltage Phase of Input θ and Direct Current Voltage Vdc]

When θ1 is increased, energy to be charged to the direct current voltage supply 19 is increased; and during subsequent discharging, a generated voltage can be superimposed on the voltage Vin of a high voltage area and energy to be discharged can be increased. Thus, the direct current voltage Vdc (target voltage Vdc*) of the smoothing capacitor 22 can be heightened.

At a phase period of 0≤θ≤π/2, as described above, the direct current voltage supply 19 of the inverter circuit 14 is charged at periods of 0≤θ≤θ1 and θ2≤θ≤π/2 and is discharged at a period of θ1≤θ≤θ2. When charging and discharging energies of the direct current voltage supply of the inverter circuit 14 are equal, the following equation is established. In this regard, however, Vp is a peak voltage of the voltage Vin and Ip is a peak current of the current Iin.

$$\int_0^{\theta_1} Vp\,\sin\theta \cdot Ip\,\sin\theta \cdot d\theta + \int_{\theta_2}^{\frac{\pi}{2}} (Vp\,\sin\theta - Vdc^*) \cdot Ip\,\sin\theta \cdot d\theta = \int_{\theta_1}^{\theta_2} (Vdc^* - Vp\,\sin\theta) \cdot Ip\,\sin\theta \cdot d\theta$$

[Equation 2]

where, in the case of Vin=Vp·sin θ and Iin=Ip·sin θ, Vdc* is Vdc*=Vp·π/(4 cos θ1).

As described above, the target voltage Vdc* of the smoothing capacitor 22 is determined by θ1 that determines the short-circuit phase range; and more specifically, control can be made by changing θ1. Then, the direct current voltage Vdc of the smoothing capacitor 22 is controlled so as to follow the target voltage Vdc*.

[Relationship Among Voltage Phase of Input θ, Direct Current Voltage Vsub, and Direct Current Voltage Vdc]

Furthermore, the voltage Vsub of the direct current voltage supply 19 is set to equal to or more than a desired generation voltage of the inverter circuit 14 in each phase range of $0 \leq \theta \leq \theta 1$, $\theta 1 \leq \theta \leq \theta 2$, $\theta 2 \leq \theta \leq \pi/2$; and thus, the inverter circuit 14 can perform the aforementioned desired control with good reliability. More specifically, the voltage Vsub is set so as to satisfy the following three conditions.

$$Vp \sin \theta 1 \leq Vsub, (Vdc^* - Vp \sin \theta 1) \leq Vsub, (Vp - Vdc^*) \leq Vsub \quad [\text{Equation 3}]$$

Thus, the direct current voltage Vdc of the smoothing capacitor 22 can be maintained at the target voltage Vdc*; and control of the inverter circuit 14, which controls the current Iin so that the power factor of input is substantially 1, can be performed with good reliability in the entire phases of the alternating current power supply 1. Incidentally, the voltage Vsub of the direct current voltage supply 19 is set to less than or equal to a peak voltage Vp of the voltage Vin.

[PWM Control Method of Inverter for Controlling Vdc]

Next, details of control of the inverter circuit 14, which maintains the direct current voltage Vdc of the smoothing capacitor 22 at the target voltage Vdc* and controls the current Iin so that the power factor of input is substantially 1, will be described hereinafter.

Figure 10:
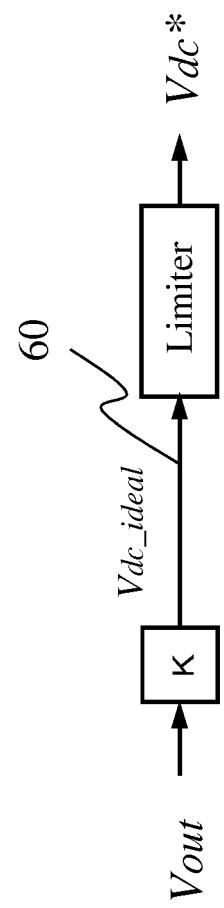
FIG. 10 is a control block diagram of the AC/DC converter section in the power conversion device according to Embodiment 1 (Part 1)
Figure 11:
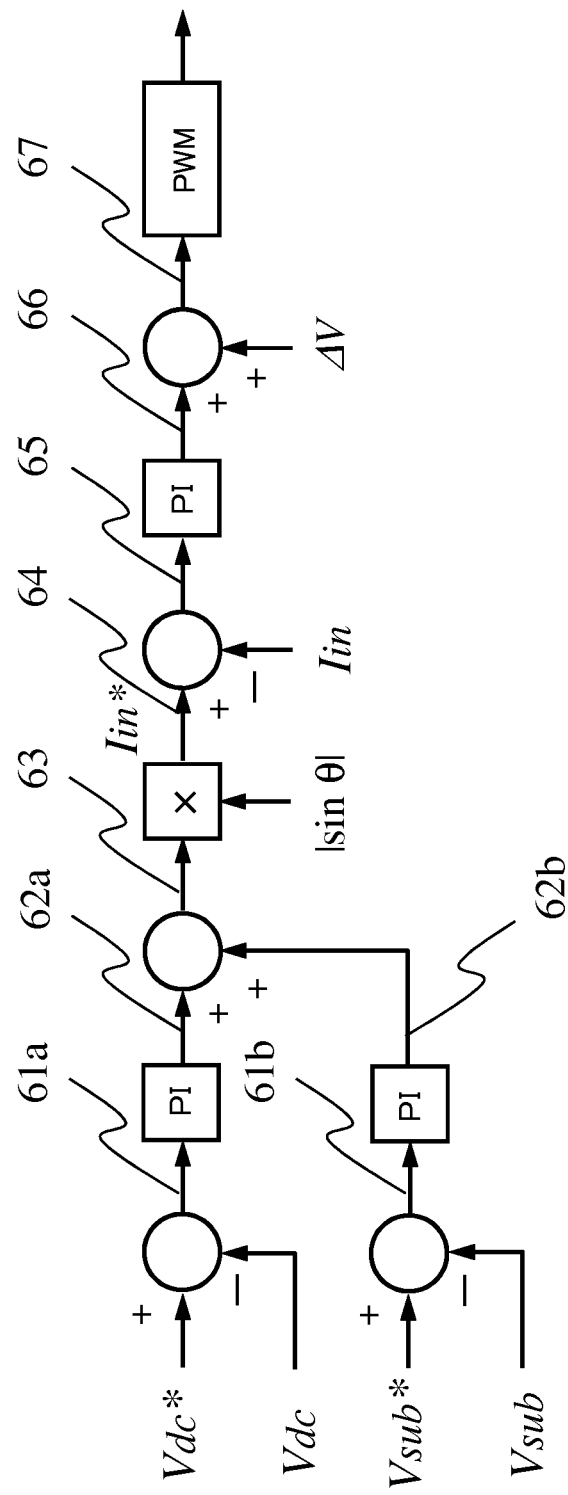
FIG. 11 is a control block diagram of the AC/DC converter section in the power conversion device according to Embodiment 1 (Part 2)

The inverter circuit 14 is controlled by control blocks as shown in FIG. 10 and FIG. 11.

First, an output voltage ideal value Vdc_ideal 60 of the direct current voltage Vdc of the smoothing capacitor is calculated by the target voltage Vout* 52 of the output voltage Vout of the DC/DC converter section 11, the turn ratio (N2/N1) of the transformer 24, and an ON time τ max of the forward converter switch 23 in which the efficiency of the DC/DC converter section 11 becomes optimum. Next, the AC/DC converter section 10 calculates a current controllable range of the direct current voltage Vdc of the smoothing capacitor 22 from the equations shown by Equation 2 and Equation 3; and in the case of (output voltage ideal value Vdc_ideal<corresponding calculation result lower limit), the corresponding calculation result lower limit is set to the target voltage Vdc* of the smoothing capacitor 22 at the output stage and the target voltage Vdc* is used to a proportional K shown in FIG. 5. Furthermore, in the case of (output voltage ideal value Vdc_ideal>corresponding calculation result lower limit), the output voltage ideal value Vdc_ideal 60 is set to the target voltage Vdc* of the smoothing capacitor 22 at the output stage. This can make the AC/DC converter section 11 perform current control with the voltage of the direct current voltage supply of the inverter being maintained constant and can make the DC/DC converter section 11 operate at a maximum efficiency point in a range of (output voltage ideal value Vdc_ideal>corresponding calculation result lower limit).

Output 62a performed by PI control by using the difference 61a between the direct current voltage Vdc and the target voltage Vdc* of the smoothing capacitor 22 at the output stage as the amount of feedback is calculated. Furthermore, in order to maintain the voltage Vsub of the direct current voltage supply 19 of the inverter circuit 14 constant, output 62b performed by PI control by using the difference 61b between the voltage Vsub and the target voltage Vsub* as the amount of feedback is calculated and an amplitude target value 63 of the current Iin is determined by the sum of both outputs 62a and 62b. Then, a sine wave current command Iin* 64 synchronized with the voltage Vin is generated based on the amplitude target value 63. Next, output performed by PI control by using the difference 65 between the current command Iin* 64 and the detected current Iin as the amount of feedback is regarded as a voltage command 66 serving as a target value of the generated voltage of the inverter circuit 14. At this time, a feedforward correction voltage ΔV synchronized in switching of conduction and opening of the short-circuiting switch 21 is added to correct the voltage command 65. Then, driving signals to be supplied to the respective inverter configuration switches 17 and 18 of the inverter circuit 14 are generated by PWM control to operate the inverter circuit 14, by using a voltage command 67 after correction.

Conduction and opening of the short-circuiting switch 21 are switched at a specific phase of a zero cross phase (θ=0, π) ±θ1 of an input voltage supplied from the alternating current power supply 1; however, the inverter circuit 14 switches from charging control to discharging control of the direct current voltage supply 19 in the case of from conduction to opening of the short-circuiting switch 21, and switches from discharging control to charging control of the direct current voltage supply 19 in the case of from opening to conduction. As described above, the feedforward correction voltage ΔV synchronized in switching of conduction and opening of the short-circuiting switch 21 is added to correct the voltage command 66; and thus, it can be prevented from delaying the control by the amount of response time of feedback control.

Subsequently, a method of starting up the thus operating power conversion device 300 will be described.

[Operation of Initial Charging Mode]

Figure 12:
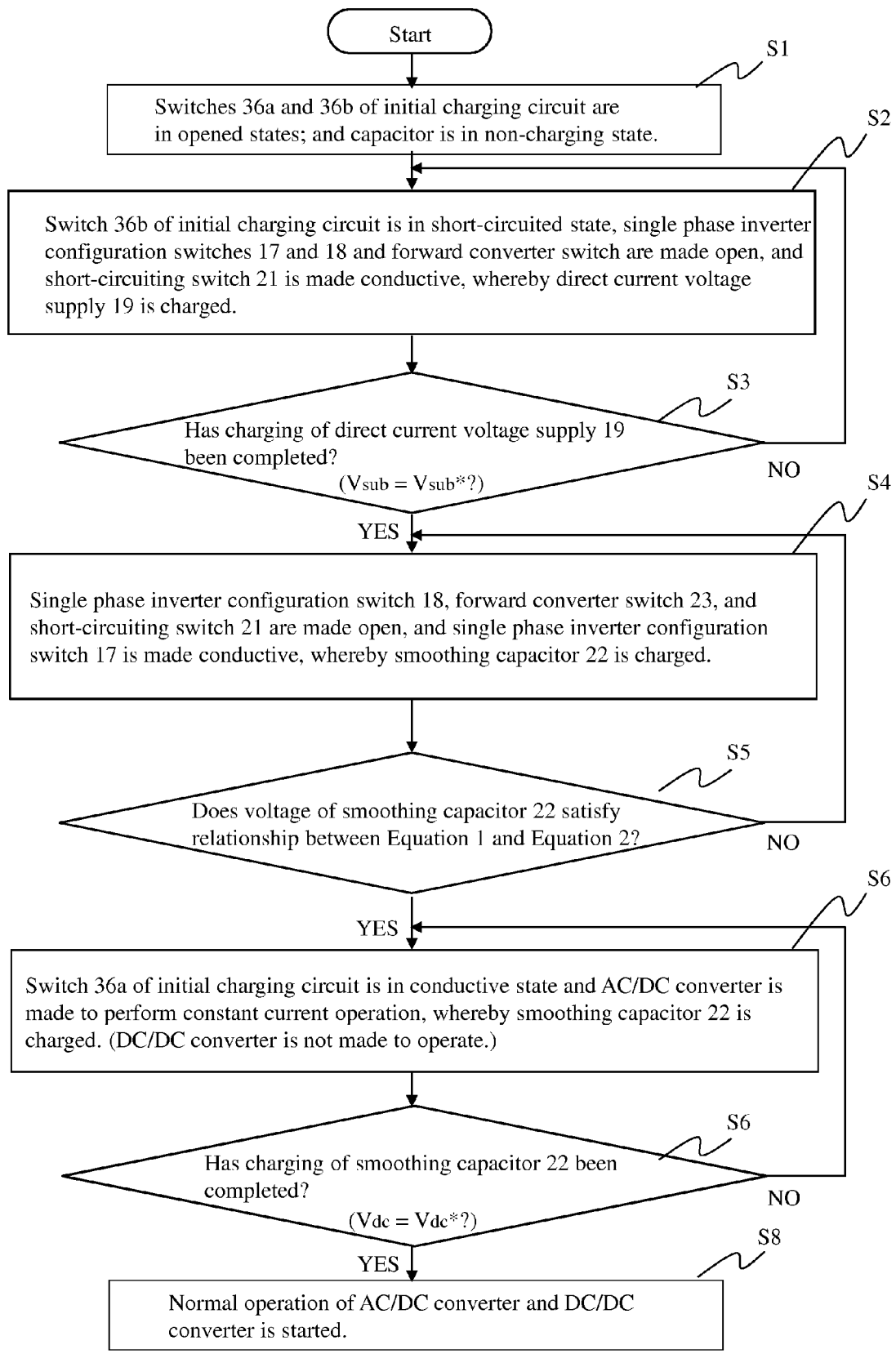
FIG. 12 is a diagram showing a flowchart during initial charging in the power conversion device according to Embodiment 1.
Figure 13:
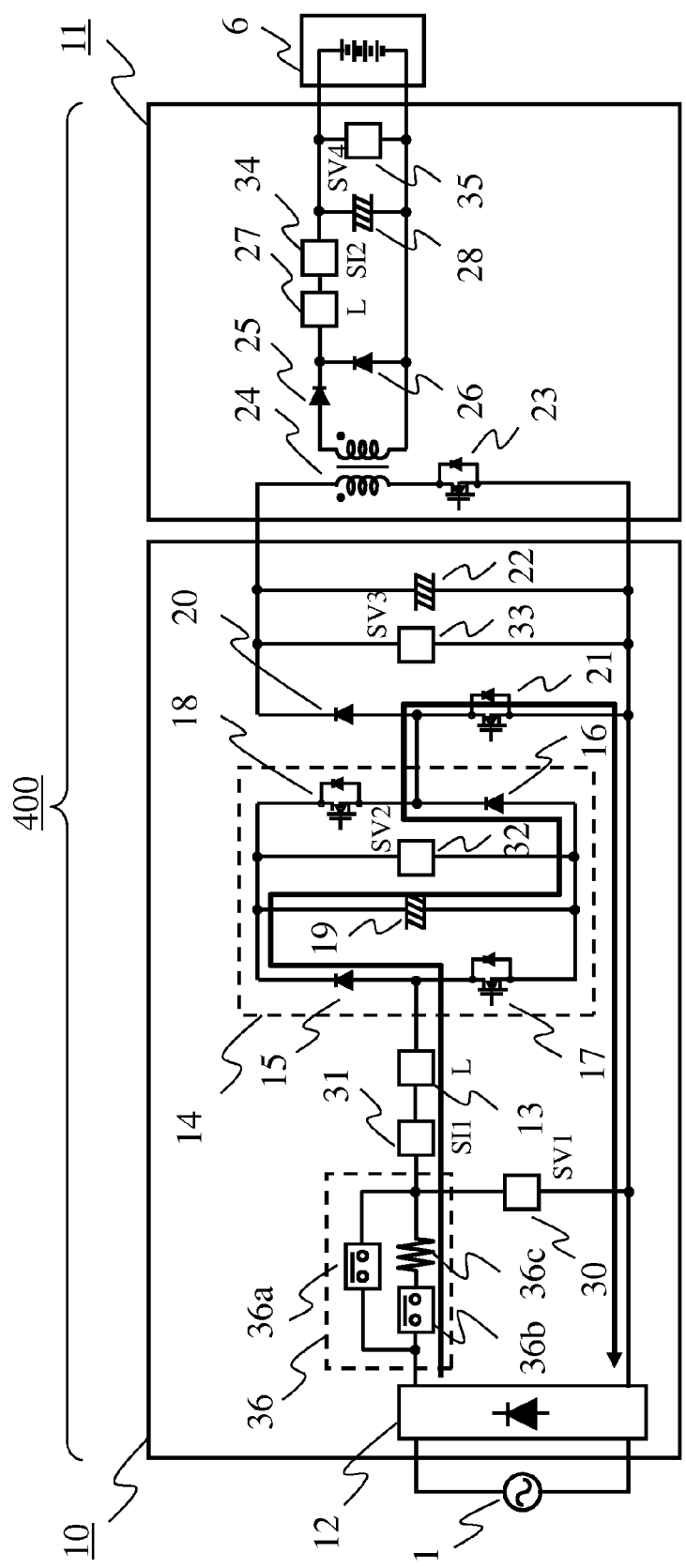
FIG. 13 is a diagram for explaining the operation during initial charging of the AC/DC converter section in the power conversion device according to Embodiment 1 (Part 1)
Figure 14:
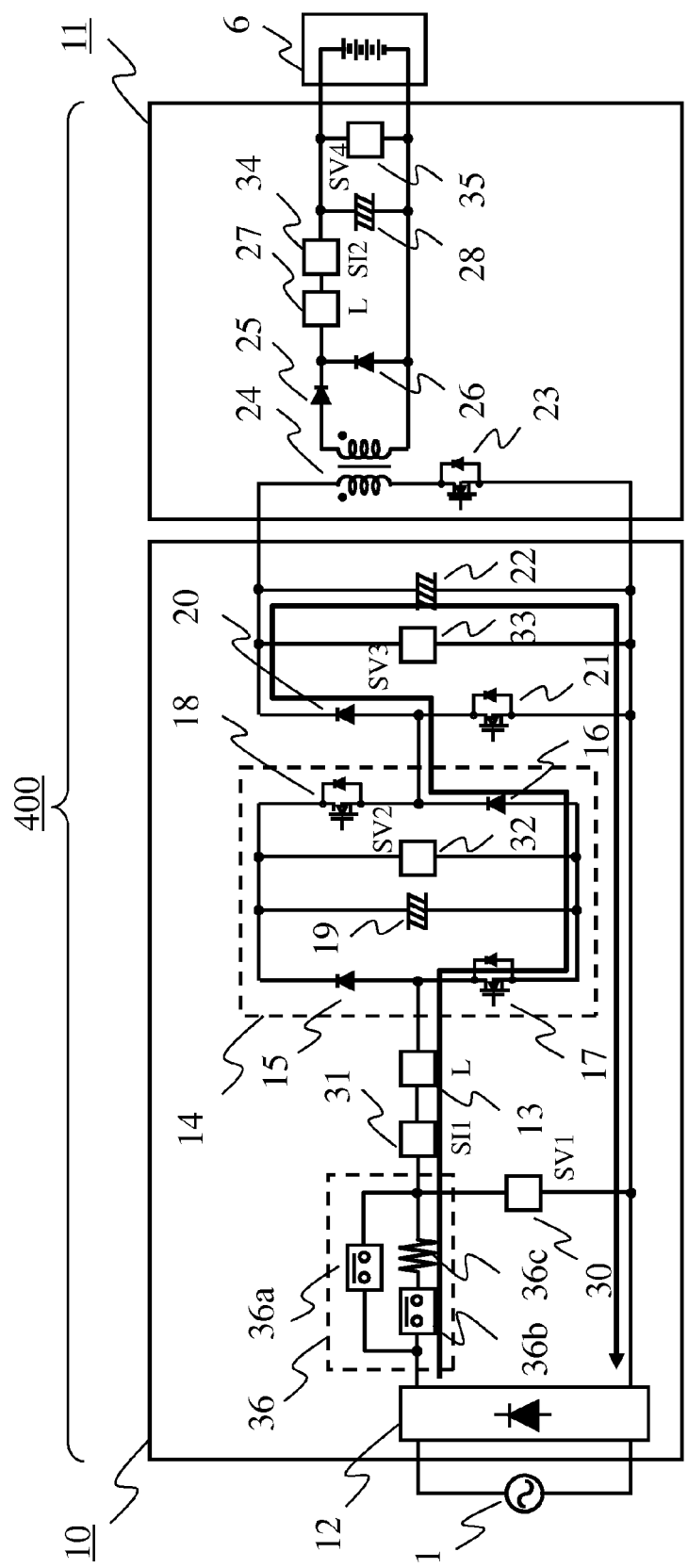
FIG. 14 is a diagram for explaining the operation during initial charging of the AC/DC converter section in the power conversion device according to Embodiment 1 (Part 2)

Voltages of the direct current voltage supply 19 and the smoothing capacitor 22 of the AC/DC converter section must be values that satisfy the relationship between the aforementioned Equation 2 and Equation 3. Thus, when the alternating current power supply 1 is connected to the power supply apparatus 200, at least the smoothing capacitor 22 needs to be initially charged (the initial charging does not need to be performed when the direct current voltage supply 19 is configured by an external voltage supply and the initial charging needs to be performed when the direct current voltage supply 19 is configured by a capacitor). Hereinafter, operation during the initial charging of the direct current voltage supply 19 and the smoothing capacitor 22 will be described, and its flowchart is shown in FIG. 12.

Initial states of both switch 36a and switch 36b of the initial charging circuit are in opened states; and the direct current voltage supply 19 and the smoothing capacitor 22 are in non-charging states (Step S1). If the alternating current power supply 1 is connected, the switch 36b of the initial charging circuit is made in a conductive state, the switch 36a is made in an opened state, the inverter configuration switches 17 and 18 and the forward converter switch 23 are made open, and the short-circuiting switch 21 is made conductive. The switches are made in such states; and thus, current restricted by a resistor 36c of the initial charging circuit flows in a path shown in FIG. 13 and the direct current voltage supply 19 is charged (Step S2). The voltage Vsub of the direct current voltage supply 19 rises up to the target voltage Vsub* and a determination is made whether or not charging has been completed (Vsub=Vsub*?) (Step S3).

If the charging has not been completed, the processing returns to Step 2 and the charging of the direct current voltage supply 19 is continued. If the charging of the direct current voltage supply 19 has been completed, the inverter configuration switch 18, the forward converter switch 23, and the short-circuiting switch 21 are made open, and the inverter configuration switch 17 is made conductive; and thus, current flows in a path shown in FIG. 14 and initial charging of the smoothing capacitor 22 is performed (Step 4).

Figure 15:
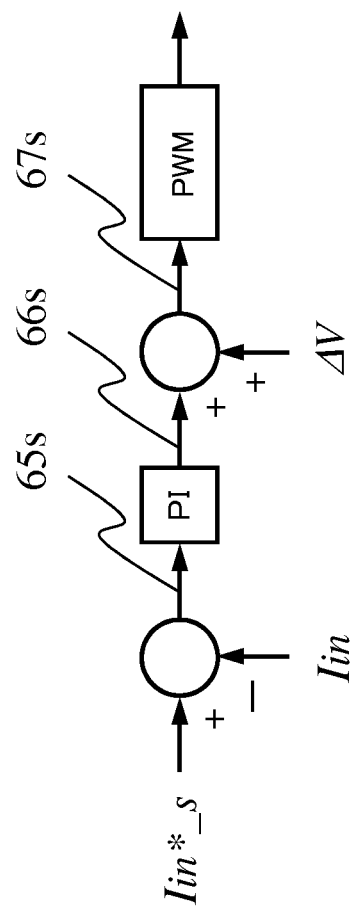
FIG. 15 is a control block diagram during initial charging of the AC/DC converter section in the power conversion device according to Embodiment 1.

Next, a determination is made whether or not the voltage of the smoothing capacitor 22 satisfies the relationship between the aforementioned Equation 2 and Equation 3 (Step S5). If the relationship between Equation 2 and Equation 3 is not satisfied, the processing returns to Step S4 and the charging of the smoothing capacitor 22 is continued. If the voltage of the smoothing capacitor 22 satisfies the relationship between Equation 2 and Equation 3, the switch 36a of the initial charging circuit is made to be in a conductive state and the AC/DC converter section is made to perform constant current operation by the control shown in FIG. 15, and the smoothing capacitor 22 is charged up to the target voltage Vdc* (Step S6). At this time, as shown in FIG. 15, output performed by PI control by using the difference 65s between a current command value Iin_s* during initial charging and a detected current Iin as the amount of feedback is regarded as a voltage command value 66s serving as a target value of a generated voltage of the inverter circuit 14. At this time, a feedforward correction voltage $\Delta V$ synchronized in switching of conduction and opening of the short-circuiting switch 21 is added to correct the voltage command value 66s. Then, driving signals to be supplied to the respective inverter configuration switches 17 and 18 of the inverter circuit 14 are generated by PWM control to operate the inverter circuit 14, by using corrected voltage command value 67s. A determination is made whether or not the voltage of the smoothing capacitor 22 reaches the target voltage Vdc* (Vdc=Vdc*?) (Step S7). If the voltage of the smoothing capacitor 22 does not reach the target voltage Vdc*, the processing returns to Step S6 and the charging of the smoothing capacitor 22 is continued. If the voltage of the smoothing capacitor 22 reaches the target voltage Vdc*, the processing transitions to a normal charging mode and power supply to the load is started (Step S8).

When the DC/DC converter section 11 is initially charged without stopping, current flows from the smoothing capacitor 22 to the DC/DC converter section 11, the voltage of the smoothing capacitor 22 lowers and the relationship between Equation 2 and Equation 3 cannot be satisfied; and accordingly, an inrush current is generated and respective switches and capacitors are likely to be damaged. On the other hand, as shown in Embodiment 1, the DC/DC converter section is made to stop and perform initial charging; and thus, the generation of the inrush current can be suppressed, the respective switches and the capacitors can be protected from damage due to the inrush current and initial charging can be safely completed.

As described above, according to the power conversion device of Embodiment 1, the initial charging of the capacitor on the direct current input portion side is performed by stopping the DC/DC converter section; and thus, there can be expected remarkable effects in which the generation of the inrush current can be suppressed, the switches and the capacitors are protected from damage, the initial charging can be safely performed, and initial charging time is short and power loss of the resistor is small and therefore power rating of the resistor can be reduced, a heat dissipation mechanism can also be simplified, and reduction in size and cost of the device can be achieved.

Incidentally, as shown in Step S7 of the flowchart in FIG. 12, in the initial charging method of the present embodiment, a determination of completion of the initial charging is performed by the voltage of the smoothing capacitor 22; however, the voltage of the capacitor is a value in which one in which a current value flowing through the capacitor is integrated by a time is divided by a capacitance of the capacitor. Thus, the determination of the completion of the initial charging may be made by measuring the initial charging time.

Furthermore, as shown in Step S7 by the flowchart of FIG. 12, in the initial charging method of the present embodiment, the determination of the completion of the initial charging is performed by the voltage of the smoothing capacitor 22; however, the voltage of the direct current voltage supply 19 may be increased by control errors in the inverter configuration switches 17 and 18 and the short-circuiting switch 21, and the fluctuation in alternating current power supply voltage. Therefore, the determination of the completion of the initial charging can be detected by the voltage of the direct current voltage supply 19 (Step S3) and the voltage of the smoothing capacitor 22 (Step S7); and thus, determination with further improved reliability can be made.

Furthermore, there is shown an example in which the AC/DC converter section 10 of the present embodiment includes the inverter circuit 14 composed of a plurality of semiconductor switching elements 17 and 18 and the direct current voltage supply 19; the voltage Vdc of the smoothing capacitor 22 is made to follow the target voltage Vdc* and the inverter circuit 14 is controlled by using the current command so as to improve the power factor of input supplied from the alternating current power supply. However, the present embodiment is not limited to this example, but similar effects can be obtained even in a configuration in which the inverter circuit 14 includes a plurality of inverters, a configuration in which a diode bridge just after input is not provided and rectification is made by a diode at a subsequent stage of the inverter circuit 14, and the like.

Figure 16:
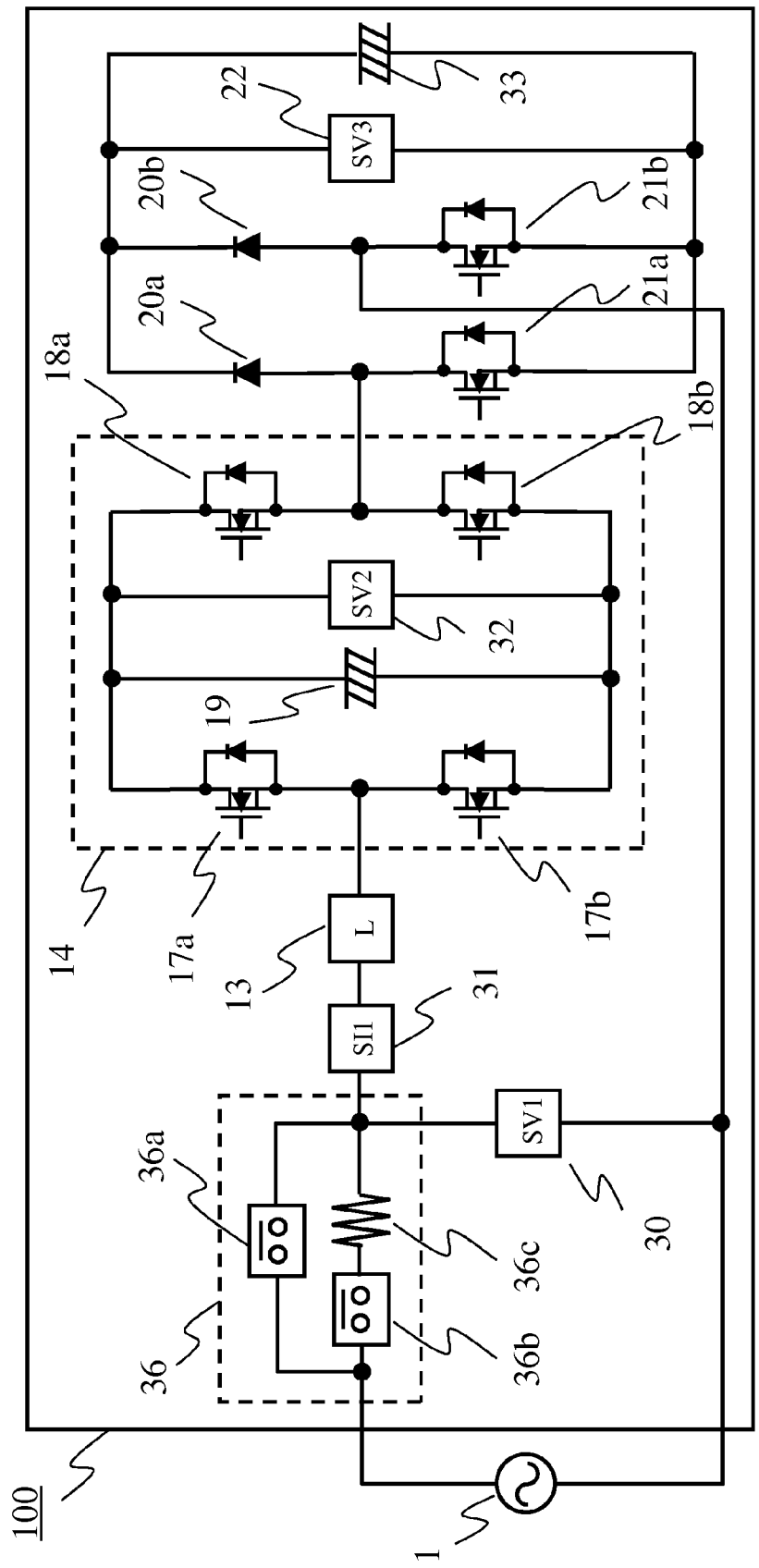
FIG. 16 is a diagram showing the circuit configuration of other embodiment of an AC/DC converter section in the power conversion device according to Embodiment 1.

Moreover, the configuration of the AC/DC converter section of the present embodiment is not limited to the above description, but a high efficient AC/DC converter section 100 as shown in the configuration of FIG. 16 may be used. In this case, an inverter circuit 14 configured by an inverter including semiconductor switching elements (inverter configuration switches) 17a, 17b, 18a, and 18b is connected to an alternating current voltage supply 1 via a reactor 13; and a bridge circuit, in which short-circuiting switches 21a and 21b made of semiconductor switching elements are connected in series with diodes 20a and 20b respectively, is provided at a subsequent stage of the inverter circuit 14.

Additionally, the AC/DC converter circuit is the high efficient converter which converts alternating current voltage into direct current voltage, and is applicable as long as the smoothing capacitor that needs at least initial charging is incorporated.

In addition, the configuration of the DC/DC converter section is not also limited to the above-mention. Then, the DC/DC converter section is not limited to the forward converter circuit, but may be other circuit configuration such as a half bridge converter; and the method of controlling the normal charging mode is not also limited to the above example.

Besides, in the above embodiment, the description has been made on the case in which the power conversion device, which is connected to the single phase alternating current power supply and the direct current load and converts alternating current input power supplied from the power supply into direct current power to supply to the direct current load, is composed of the AC/DC converter section and the DC/DC converter section. However, the present embodiment is not limited to this case, but a configuration may be such that, for example, a power supply performs alternating current direct current power conversion of alternating current input power supplied from a three phase alternating current power supply and supplies to a direct current load, as long as the configuration is made such that a power conversion device, which is connected to a power supply and a load and performs power conversion of input power supplied from the power supply and supplies to the load, is formed by connecting a power conversion circuit on the power supply side and a power conversion circuit on the load side, where at least a smoothing capacitor that needs initial charging is incorporated in the power conversion circuit on the power supply side and the power conversion circuit on the load side is provided with a switch by which input current supplied from the power conversion circuit on the power supply side can be interrupted according to the state of the switch.

Embodiment 2

Figure 17:
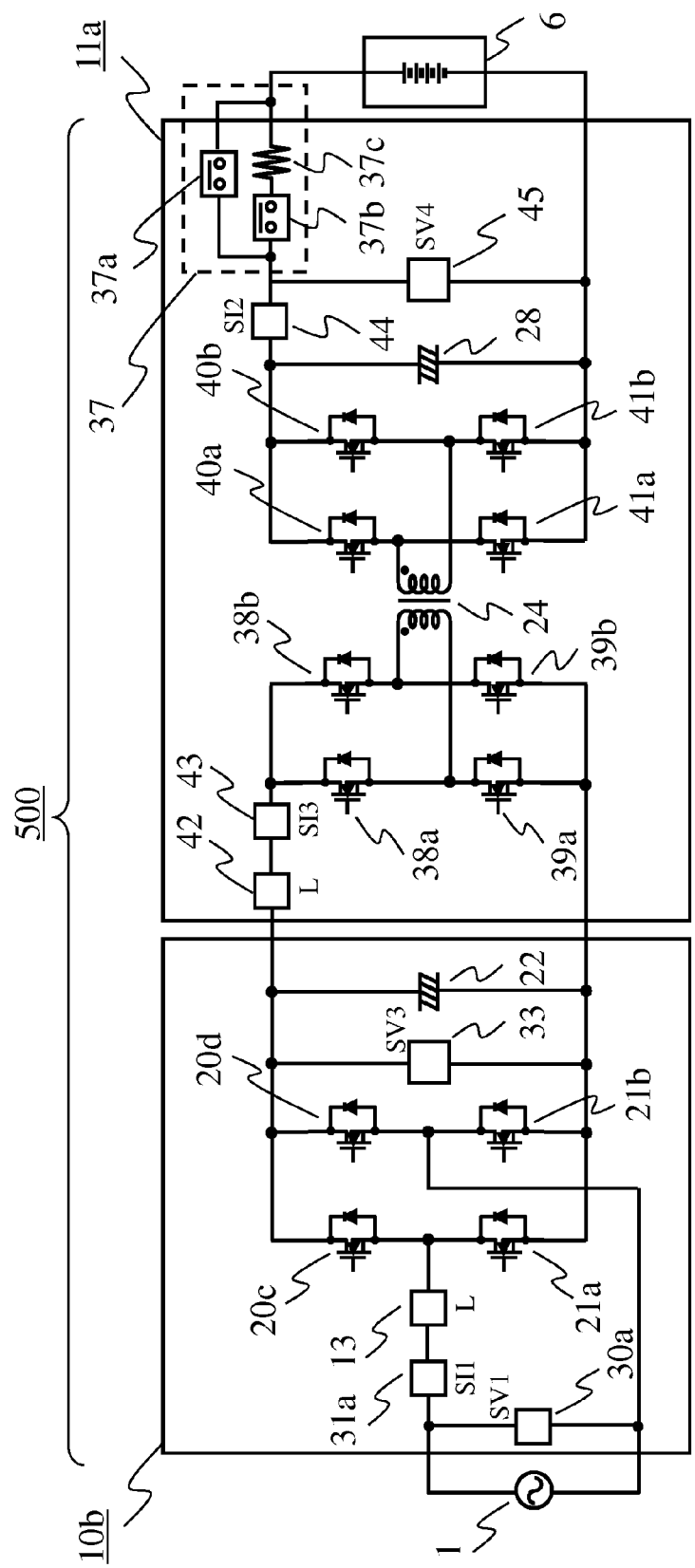
FIG. 17 is a diagram showing the circuit configuration of a power conversion device according to Embodiment 2.
Figure 18:
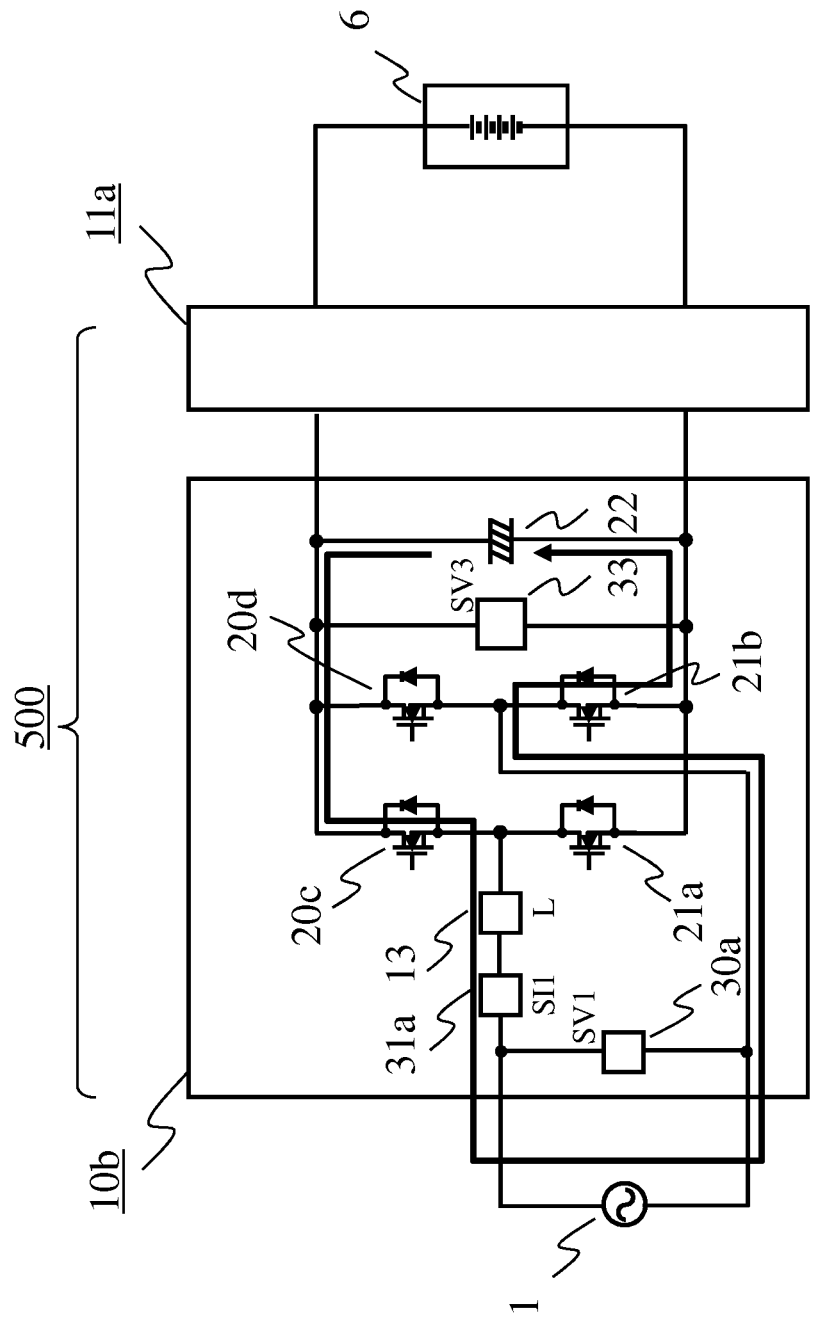
FIG. 18 is a diagram for explaining the operation of an AC/DC converter section in the power conversion device according to Embodiment 2 (Part 1)
Figure 19:
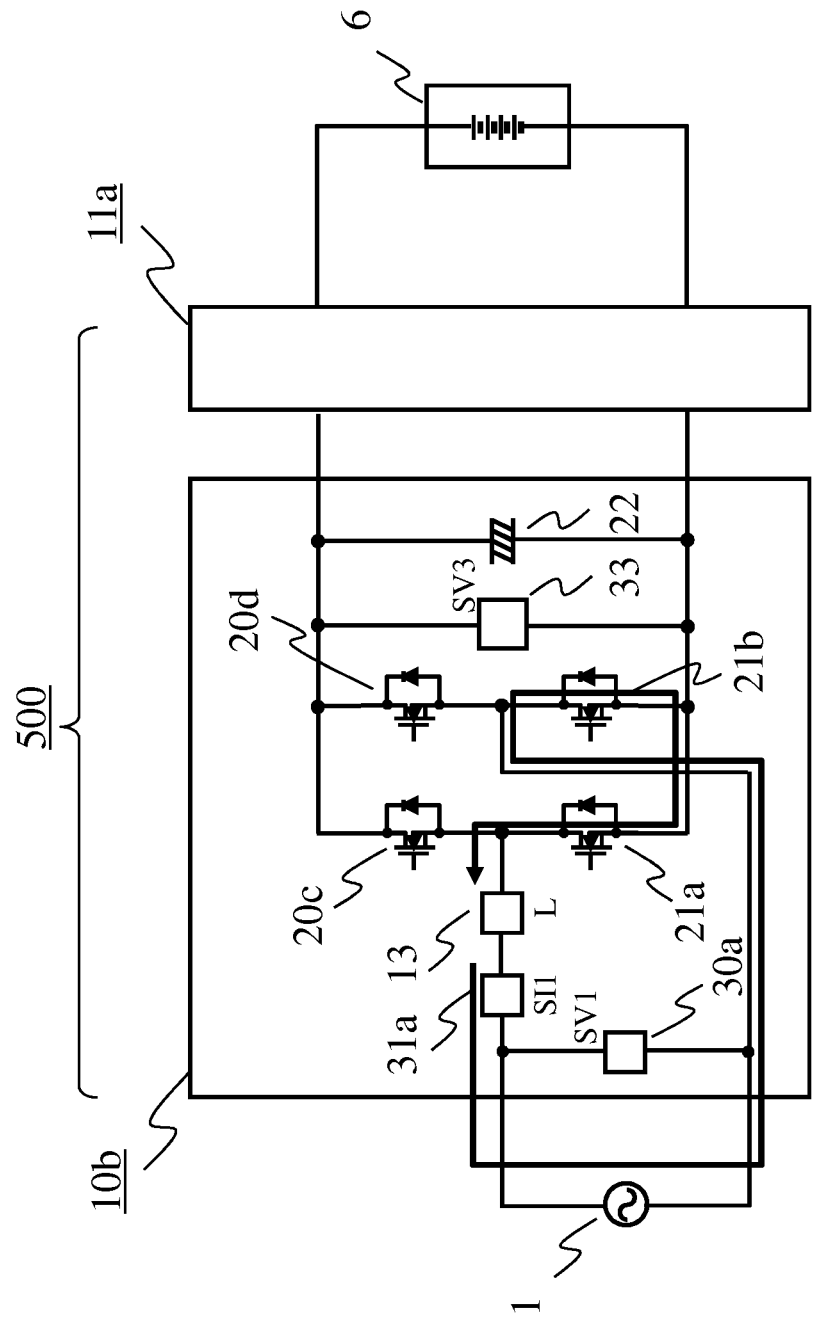
FIG. 19 is a diagram for explaining the operation of the AC/DC converter section in the power conversion device according to Embodiment 2 (Part 2).

FIG. 17 is a diagram showing the circuit configuration of a power conversion device according to Embodiment 2. FIG. 18 is a diagram for explaining the operation of an AC/DC converter section of the power conversion device according to Embodiment 2 (Part 1). Furthermore, FIG. 19 is a diagram for explaining the operation of an AC/DC converter section of the power conversion device according to Embodiment 2 (Part 2). The conversion is made from the alternating current power supply to direct current in Embodiment 1; however, in Embodiment 2, conversion is made from a direct current power supply to alternating current to regenerate power. Furthermore, the difference between the circuit configurations of Embodiment 1 and Embodiment 2 is that the initial charging circuit 36 is provided in the AC/DC converter section 10 on the alternating current input portion side to charge the capacitor 22 in Embodiment 1; whereas, in Embodiment 2, an initial charging circuit 37 is provided in a DC/DC converter section 11a on the direct current input portion side to charge a capacitor 28. Incidentally, other basic configuration of FIG. 17 is similar to that of FIG. 2 and therefore description thereof will be omitted.

Next, the operation of Embodiment 2 will be described. In the circuit configuration of FIG. 17, at start-up, voltage of the capacitor 28 is 0 and voltage of the capacitor 22 is equal to an AC power supply voltage peak value. First, if the direct current power supply 6 (high voltage battery) is connected, the capacitor 28 is charged by the initial charging circuit 37. If the charging of the capacitor 28 has been competed, inverter configuration switches 40a, 40b, 41a, and 41b are made to perform PWM operation, current flowing through a smoothing reactor 42 is controlled to be low by lowering switching duty thereof and the capacitor 22 is initially charged at a low current.

Further, if the charging of the capacitor 22 has been completed, stationary operation is started. A control unit 5 controls rectifying switches 20c and 20d and short-circuiting switches 21a and 21b so that current flows with a power factor of 1 from an AC/DC converter 10b to the alternating current power supply side. For example, in the case where alternating current power supply voltage is positive (voltage of contacts of 30a and 31a is higher than voltage of contacts of 20d and 21b) and when current to be flown to the alternating current power supply side is made to increase, the rectifying switches 20c and 20d and the short-circuiting switches 21a and 21b are controlled to form a path shown in FIG. 18. Furthermore, in the case where the alternating current power supply voltage is positive and current to be flown to the alternating current power supply side is made to decrease, the rectifying switches 20c and 20d and the short-circuiting switches 21a and 21b are controlled to form a current path shown in FIG. 19.

As described above, according to the power conversion device according to Embodiment 2, even when power is regenerated from the direct current power supply to the alternating current power supply, initial charging of the capacitor on the DC/DC converter section is performed by making the AC/DC converter section to stop; and thus, as in Embodiment 1, there can be expected remarkable effects in which the generation of an inrush current can be suppressed, the switches and the capacitors are protected from damage, the initial charging can be safely performed, and initial charging time is short and power loss of a resistor is small and therefore power rating of the resistor can be reduced, a heat dissipation mechanism can also be simplified, and reduction in size and cost of the device can be achieved.

Furthermore, the present invention can freely combine the respective embodiments and appropriately change or omit the respective embodiments, within the scope of the present invention.

Besides, the same reference numerals as those shown in the drawings represent the same or corresponding elements.

DESCRIPTION OF REFERENCE NUMERALS

1 Alternating current power supply,
5 Control unit,
6 High voltage battery,
10, 10b, 100 AC/DC converter section,
11, 11a DC/DC converter section,
12 Diode bridge,
13, 42 Reactor,
14 Inverter circuit,
17, 17a, 17b, 18, 18a, 18b, 40a, 40b, 41a, 41b Inverter configuration switch (Semiconductor switching element),
19 Direct current voltage supply (Capacitor),
20c, 20d Rectifying switch,
21, 21a, 21b Short-circuiting switch,
22 Smoothing capacitor,
23 Forward converter switch,
24 Transformer,
28 Capacitor,
30, 30a Rectified voltage detection circuit,
31, 31a Rectified current detection circuit,
32 Direct current voltage supply voltage detection circuit,
33 Smoothing capacitor voltage detection circuit,
34, 44 Output (input) current detection circuit,
35, 45 Output (input) voltage detection circuit,
36, 37 Initial charging circuit,
43 Reactor current detection circuit,
200 Power supply apparatus,
300 Power conversion device, and
400, 500 Power conversion circuit

The invention claimed is:

1. A power conversion device, comprising:
an alternating current/direct current conversion circuit section which has a smoothing capacitor provided at an output portion and an initial charging circuit that initially charges said smoothing capacitor, and converts alternating current power into direct current power;

a direct current/direct current conversion circuit section which has a switching element, and performs voltage conversion of direct current power supplied from said smoothing capacitor by controlling said switching element; and a control unit which controls input and output of said alternating current/direct current conversion circuit section and said direct current/direct current conversion circuit section, wherein said control unit performs a predetermined charging to said smoothing capacitor by said initial charging circuit and said alternating current/direct current conversion circuit section at start-up of said alternating current/direct current conversion circuit section, and starts operation of said direct current/direct current conversion circuit section after completion of charging of said smoothing capacitor by said initial charging circuit, wherein said alternating current/direct current conversion circuit section includes an inverter circuit which is connected to a single inverter or a plurality of inverters in series, said inverter having a direct current voltage supply and a plurality of semiconductor switching elements that perform charging and discharging of said direct current voltage supply, and wherein completion of charging of said smoothing capacitor is determined by voltage of said smoothing capacitor and voltage of said direct current voltage supply.

2. The power conversion device according to claim 1, wherein said alternating current/direct current conversion circuit section further includes:

a rectifying element provided at a subsequent stage of said inverter circuit;

said smoothing capacitor which is connected to said rectifying element, and smooths and outputs output of said inverter circuit; and a short-circuiting switch element which bypasses current to be supplied to said smoothing capacitor.

3. The power conversion device according to claim 2, wherein the alternating current power is three phase alternating current, and said inverter circuit of each phase is connected in series.

4. The power conversion device according to claim 1, wherein said control unit makes voltage of said smoothing capacitor follow target voltage and controls input current so as to bring a power factor of input close to 1, the input being supplied from the alternating current power.

* * * * *